US009363843B2

(12) United States Patent
Ohta

(10) Patent No.: US 9,363,843 B2
(45) Date of Patent: Jun. 7, 2016

(54) RADIO COMMUNICATION METHOD, RADIO COMMUNICATION SYSTEM, AND RADIO STATION

(71) Applicant: FUJITSU LIMITED, Kawasaki-shi, Kanagawa (JP)

(72) Inventor: Yoshiaki Ohta, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/919,192

(22) Filed: Oct. 21, 2015

(65) Prior Publication Data
US 2016/0044735 A1 Feb. 11, 2016

Related U.S. Application Data

(63) Continuation of application No. PCT/JP2013/003018, filed on May 10, 2013.

(51) Int. Cl.
*H04M 11/00* (2006.01)
*H04W 76/02* (2009.01)

(52) U.S. Cl.
CPC .................................. *H04W 76/025* (2013.01)

(58) Field of Classification Search
CPC ... H04W 76/025; H04W 36/36; H04W 40/36; H04W 36/0016; H04W 52/02; H04W 76/02; H04W 36/0083; H04L 29/06088
USPC ............. 455/412.1–414.2, 418–422.1, 432.1, 455/433, 435.2, 435.3, 436, 437–438, 439, 455/440, 444, 450–453, 457; 370/328, 329, 370/330, 331, 332, 338, 341, 472, 348
See application file for complete search history.

(56) References Cited

U.S. PATENT DOCUMENTS

| 7,155,223 | B2* | 12/2006 | O'Brien | H04W 36/0083 370/331 |
| 8,768,305 | B1* | 7/2014 | Singh | H04W 76/028 370/329 |

(Continued)

FOREIGN PATENT DOCUMENTS

JP 2010-519868 A 6/2010

OTHER PUBLICATIONS

Intel Corporation, CA Signaling Enhancements for HetNet Deployments (R2-115377, 3GPP, Oct. 14, 2011).*

(Continued)

*Primary Examiner* — Babar Sarwar
(74) *Attorney, Agent, or Firm* — Myers Wolin, LLC

(57) ABSTRACT

A radio communication method including: transmitting first information from a first radio station to a second radio station before determining an activation of a second logical processing entity that is to be activated in a first processing layer of the second radio station in association with a first logical processing entity that has been activated in the first processing layer of the second radio station, the first information relating to the activation of the second logical processing entity, the first information being transmitted using a first control signal in a higher layer of the first processing layer, transmitting, when determining the activation of the second logical processing entity, second information for instructing the activation from the first radio station to the second radio station, the second information being transmitted using a second control signal in the first processing layer.

11 Claims, 30 Drawing Sheets

(56) References Cited

U.S. PATENT DOCUMENTS

| | | | | |
|---|---|---|---|---|
| 8,879,505 | B2* | 11/2014 | Zhou | H04W 12/06 370/331 |
| 9,019,987 | B1* | 4/2015 | Marupaduga | H04W 4/00 370/465 |
| 2002/0163902 | A1* | 11/2002 | Takao | H04L 12/189 370/338 |
| 2005/0047416 | A1* | 3/2005 | Heo | H04W 72/1242 370/395.4 |
| 2007/0091924 | A1* | 4/2007 | Hsieh | H04L 5/1446 370/469 |
| 2008/0019320 | A1* | 1/2008 | Phan | H04W 36/02 370/331 |
| 2008/0020767 | A1* | 1/2008 | Takai | H04W 36/30 455/436 |
| 2008/0130580 | A1* | 6/2008 | Chaponniere | H04W 36/02 370/331 |
| 2009/0203374 | A1* | 8/2009 | Chun | H04L 1/1628 455/425 |
| 2009/0303913 | A1* | 12/2009 | Yu | H04B 7/0669 370/312 |
| 2012/0044836 | A1* | 2/2012 | Sivavakeesar | H04W 24/02 370/255 |
| 2012/0077509 | A1* | 3/2012 | Huang | H04W 76/028 455/450 |
| 2012/0329442 | A1* | 12/2012 | Luft | H04W 74/0866 455/418 |
| 2013/0039339 | A1* | 2/2013 | Rayavarapu | H04W 76/028 370/331 |
| 2013/0083650 | A1* | 4/2013 | Taleb | H04W 8/30 370/218 |
| 2013/0136078 | A1* | 5/2013 | Bucknell | H04W 28/06 370/329 |
| 2013/0150024 | A1* | 6/2013 | Burbidge | H04W 24/04 455/423 |
| 2013/0188604 | A1* | 7/2013 | Chin | H04W 76/062 370/331 |
| 2013/0250881 | A1* | 9/2013 | Liao | H04W 36/08 370/329 |
| 2014/0092866 | A1* | 4/2014 | Teyeb | H04W 76/045 370/331 |

OTHER PUBLICATIONS

3GPP TS 36.300 V11.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2013.

3GPP TS 36.321 V11.2.0, "3rd Generation Partnership Project; Technical Specification Group Radio Access Network; Evolved Universal Terrestrial Radio Access (E-UTRA); Medium Access Control (MAC) protocol specification (Release 11)", Mar. 2013.

3GPP TS 36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)", Sep. 2012.

3GPP TS 36.323 V11.2.0, "3rd Generation Partnership Project; Technical Specification Group Radio Access Network; Evolved Universal Terrestrial Radio Access (E-UTRA); Packet Data Convergence Protocol (PDCP) specification (Release 11)", Mar. 2013.

3GPP TS 36.331 V11.3.0, "3rd Generation Partnership Project; Technical Specification Group Radio Access Network; Evolved Universal Terrestrial Radio Access (E-UTRA); Radio Resource Control (RRC); Protocol specification (Release 11)", Mar. 2013.

Research in Motion, UK Limited, "Discussion on Protocol Stack Support in Small Cell eNB", Agenda Item: 7.2, 3GPP TSG RAN WG2 Meeting #81, R2-130068, St. Julian's, Malta, Jan. 28-Feb. 1, 2013.

InterDigital Communications, "User Plane Architecture for Dual-Connectivity", Agenda Item: 7.2, 03GPP TSG RAN-WG2 Meeting #81bis, Tdoc R2-131327, Chicago, USA, Apr. 15-19, 2013.

International Search Report with Written Opinion issued for corresponding International Patent Application No. PCT/JP2013/003018, mailed Jun. 18, 2013, with partial English translation.

Intel Corporation, "CA Signaling Enhancements for HetNet Deployments", Agenda Item: 7.1.2, 3GPP TSG RAN-WG2 Meeting #75bis, R2-115377, Zhuhai, China, Oct. 10-14, 2011.

Intel Corporation, "Considerations on CA Signaling Improvement", Agenda Item: 7.1.3, 3GPP TSG RAN-WG2 Meeting #76, R2-116269, San Francisco, USA, Nov. 14-18, 2011.

Intel Corporation, "CA Signaling Enhancements for HetNet Type Deployments", Agenda Item: 7.1.3, 3GPP TSG RAN-WG2 Meeting #77, R2-120266, Dresden, Germany, Feb. 6-10, 2012.

Motorola, "[70#11] LTE CA: S-cell activation status after handover", Agenda Item: 7.1.1.4, 3GPP TSG-RAN WG2 Meeting #70bis, R2-103912, Stockholm, Sweden, Jun. 28-Jul. 2, 2010.

Extended European search report with the supplementary European search report and the European search opinion issued for corresponding European Patent Application No. 13883936.0 dated Apr. 12, 2016.

Ericsson et al., "Protocol architecture alternatives for dual connectivity", Agenda Item: 7.2, 3GPP TSG-RAN WG2 #81, R2-130420, Malta, Jan. 28-Feb. 1, 2013.

New Postcom, "Consideration on NW architecture and radio protocol for small cell enhancements", Agenda Item: 7.2, 3GPP TSG RAN WG2 Meeting #81bis, R2-131006, Chicago, IL (US), Apr. 15-19, 2013.

Ericsson et al., "Protocol architecture alternatives for dual connectivity", Agenda Item: 7.2, 3GPP TSG-RAN WG2 #81bis, R2-131205, Chicago, IL (US), Apr. 15-19, 2013.

* cited by examiner

FIG. 8

RRCConnectionReconfiguration MESSAGE

```
RRCConnectionReconfiguration ::= SEQUENCE {
    rrc-TransactionIdentifier    RRC-TransactionIdentifier,
    criticalExtensions    CHOICE {
        c1                    CHOICE{
            rrcConnectionReconfiguration-r8 RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE {}
    }
}

RRCConnectionReconfiguration-r8-IEs ::= SEQUENCE {
    measConfig MeasConfig    OPTIONAL,    -- Need ON
    mobilityControlInfo    MobilityControlInfo    OPTIONAL,    -- Cond HO
    dedicatedInfoNASList    SEQUENCE (SIZE(1..maxDRB)) OF
                                                  DedicatedInfoNAS    OPTIONAL,    -- Cond nonHO
    radioResourceConfigDedicated    RadioResourceConfigDedicated
                                                                      OPTIONAL,    -- Cond HO-toEUTRA
    securityConfigHO    SecurityConfigHO    OPTIONAL,    -- Cond HO
    nonCriticalExtension    RRCConnectionReconfiguration-v890-IEs    OPTIONAL
}

<SNIP>

RRCConnectionReconfiguration-v1130-IEs ::= SEQUENCE {
    systemInfomationBlockType1Dedicated-r11    OCTET STRING (CONTAINING
                                                  SystemInformationBlockType1)    OPTIONAL,    -- Need ON
    nonCriticalExtension    SEQUENCE {}    OPTIONAL    -- Need OP
}

<SNIP>
```

FIG. 9

RadioResourceConfigDedicated INFORMATION ELEMENT

```
RadioResourceConfigDedicated ::= SEQUENCE {
   srb-ToAddModList    SRB-ToAddModList OPTIONAL, -- Cond HO-Conn
   drb-ToAddModList    DRB-ToAddModList OPTIONAL, -- Cond HOtoEUTRA
<SNIP>
   ...
}

SRB-ToAddModList ::= SEQUENCE (SIZE (1..2)) OF SRB-ToAddMod

SRB-ToAddMod ::= SEQUENCE {
   srb-Identity    INTEGER (1..2),
   rlc-Config    CHOICE {
      explicitValue    RLC-Config,
      defaultValue    NULL
   } OPTIONAL, -- Cond Setup
      logicalChannelConfig    CHOICE {
      explicitValue    LogicalChannelConfig,
      defaultValue    NULL
   } OPTIONAL, -- Cond Setup
   ...
}

DRB-ToAddModList ::= SEQUENCE (SIZE (1..maxDRB)) OF DRB-ToAddMod

DRB-ToAddMod ::= SEQUENCE {
   eps-BearerIdentity    INTEGER (0..15)    OPTIONAL, -- Cond DRB-Setup
   drb-Identity    DRB-Identity,
   pdcp-Config    PDCP-Config    OPTIONAL, -- Cond PDCP
   rlc-Config    RLC-Config    OPTIONAL, -- Cond Setup
   logicalChannelIdentity    INTEGER (3..10)    OPTIONAL, -- Cond DRB-Setup
   logicalChannelConfig    LogicalChannelConfig    OPTIONAL, -- Cond Setup
   ...
}

<SNIP>

RLC-Config INFORMATION ELEMENT

```
RLC-Config ::= CHOICE {
  am   SEQUENCE {
    ul-AM-RLC   UL-AM-RLC,
    dl-AM-RLC   DL-AM-RLC
  },
  um-Bi-Directional SEQUENCE {
    ul-UM-RLC   UL-UM-RLC,
    dl-UM-RLC   DL-UM-RLC
  },
  um-Uni-Directional-UL SEQUENCE {
    ul-UM-RLC   UL-UM-RLC
  },
  um-Uni-Directional-DL SEQUENCE {
    dl-UM-RLC   DL-UM-RLC
  },
  ...
}

UL-AM-RLC ::= SEQUENCE {
  t-PollRetransmit   T-PollRetransmit,
  pollPDU   PollPDU,
  pollByte   PollByte,
  maxRetxThreshold   ENUMERATED {t1, t2, t3, t4, t6, t8, t16, t32}
}

DL-AM-RLC ::= SEQUENCE {
  t-Reordering   T-Reordering,
  t-StatusProhibit   T-StatusProhibit
}

UL-UM-RLC ::= SEQUENCE {
  sn-FieldLength   SN-FieldLength
}

DL-UM-RLC ::= SEQUENCE {
  sn-FieldLength   SN-FieldLength,
  t-Reordering   T-Reordering
}

<SNIP>
```

FIG. 11

RRCConnectionReconfiguration MESSAGE

```
RRCConnectionReconfiguration ::= SEQUENCE {
  rrc-TransactionIdentifier  RRC-TransactionIdentifier,
  criticalExtensions   CHOICE {
    c1             CHOICE{
      rrcConnectionReconfiguration-r8 RRCConnectionReconfiguration-r8-IEs,
      spare7 NULL,
      spare6 NULL, spare5 NULL, spare4 NULL,
      spare3 NULL, spare2 NULL, spare1 NULL
    },
    criticalExtensionsFuture   SEQUENCE {}
  }
}

RRCConnectionReconfiguration-r8-IEs ::= SEQUENCE {
  measConfig MeasConfig   OPTIONAL,   -- Need ON
  mobilityControlInfo   MobilityControlInfo   OPTIONAL,   -- Cond HO
  dedicatedInfoNASList   SEQUENCE (SIZE(1..maxDRB)) OF
                                           DedicatedInfoNAS   OPTIONAL,   -- Cond nonHO
  radioResourceConfigDedicated   RadioResourceConfigDedicated
                                                OPTIONAL,   -- Cond HO-toEUTRA
  securityConfigHO   SecurityConfigHO   OPTIONAL,   -- Cond HO
  nonCriticalExtension   RRCConnectionReconfiguration-v890-IEs   OPTIONAL
}
 <SNIP>

RRCConnectionReconfiguration-v1130-IEs ::= SEQUENCE {
  systemInfomationBlockType1Dedicated-r11   OCTET STRING (CONTAINING
                                           SystemInformationBlockType1)  OPTIONAL,  -- Need ON
  nonCriticalExtension   RRCConnectionReconfiguration-v1200-IEs   OPTIONAL
}

RRCConnectionReconfiguration-v1200-IEs ::= SEQUENCE {
  sPCellToReleaseList-r12   SPCellToReleaseList-r12   OPTIONAL,   -- Need ON
  sPCellToAddModList-r12   SPCellToAddModList-r12   OPTIONAL,   -- Need ON
  nonCriticalExtension   SEQUENCE {}   OPTIONAL   -- Need OP
}

SPCellToAddModList-r12 ::=   SEQUENCE (SIZE (1..maxSPCell-r12)) OF SPCellToAddMod-r12

SPCellToAddMod-r12 ::=   SEQUENCE {
  sPCellIndex-r12   SConnectionIndex-r12,
  cellIdentification-r12   SEQUENCE {
      physCellId-r12   PhysCellId,
      dl-CarrierFreq-r12   ARFCN-ValueEUTRA
   } OPTIONAL,   -- Cond SPCellAdd
   radioResourceConfigCommonSPCell-r12   RadioResourceConfigCommonSPCell-r12
OPTIONAL,   -- Cond SPCellAdd
   radioResourceConfigDedicatedSPCell-r12   RadioResourceConfigDedicatedSPCell-r12
OPTIONAL,   -- Cond SPCellAdd2
   ...
}

SPCellToReleaseList-r12 ::= SEQUENCE (SIZE (1..maxSPCell-r12)) OF SPCellIndex-r12

<SNIP>
```

FIG. 12

RadioResourceConfigDedicatedSPCell-r12 INFORMATION ELEMENT

```
RadioResourceConfigDedicatedSPCell-r12 ::= SEQUENCE {
   srb-ToAddModList-r12    SRB-ToAddModList-r12 OPTIONAL, -- Cond HO-Conn
   drb-ToAddModList-r12    DRB-ToAddModList-r12 OPTIONAL, -- Cond HOtoEUTRA
<SNIP>
...
}

SRB-ToAddModList-r12 ::= SEQUENCE (SIZE (1..2)) OF SRB-ToAddMod-r12

SRB-ToAddMod-r12 ::= SEQUENCE {
   srb-Identity-r12    INTEGER (1..2),
   rlc-Config-r12    CHOICE {
      explicitValue    RLC-Config-r12,
      defaultValue    NULL
   } OPTIONAL, -- Cond Setup
      logicalChannelConfig-r12    CHOICE {
      explicitValue    LogicalChannelConfig-r12,
      defaultValue    NULL
   } OPTIONAL, -- Cond Setup
...
}

DRB-ToAddModList-r12 ::= SEQUENCE (SIZE (1..maxDRB)) OF DRB-ToAddMod-r12

DRB-ToAddMod-r12 ::= SEQUENCE {
   eps-BearerIdentity-r12    INTEGER (0..15)    OPTIONAL, -- Cond DRB-Setup
   drb-Identity-r12    DRB-Identity-r12,
   pdcp-Config-r12    PDCP-Config-r12    OPTIONAL, -- Cond PDCP
   rlc-Config-r12    RLC-Config-r12    OPTIONAL, -- Cond Setup
   logicalChannelIdentity-r12    INTEGER (3..10)    OPTIONAL, -- Cond DRB-Setup
   logicalChannelConfig-r12    LogicalChannelConfig-r12    OPTIONAL, -- Cond Setup
...
}

<SNIP>

RLC-Config-r12 INFORMATION ELEMENT

```
RLC-Config-r12 ::= CHOICE {
   am-r12   SEQUENCE {
      ul-AM-RLC-r12    UL-AM-RLC-r12,
      dl-AM-RLC-r12    DL-AM-RLC-r12,
      ul-AM-sRLC-r12   UL-AM-RLC-r12,
      dl-AM-sRLC-r12   DL-AM-RLC-r12
   },
   um-Bi-Directional-r12 SEQUENCE {
      ul-UM-RLC-r12    UL-UM-RLC-r12,
      dl-UM-RLC-r12    DL-UM-RLC-r12,
      ul-UM-sRLC-r12   UL-UM-RLC-r12,
      dl-UM-sRLC-r12   DL-UM-RLC-r12
   },
   um-Uni-Directional-UL-r12 SEQUENCE {
      ul-UM-RLC-r12    UL-UM-RLC-r12,
      ul-UM-sRLC-r12   UL-UM-RLC-r12
   },
   um-Uni-Directional-DL-r12 SEQUENCE {
      dl-UM-RLC-r12    DL-UM-RLC-r12,
      dl-UM-sRLC-r12   DL-UM-RLC-r12
   },
   ...
}

UL-AM-RLC-r12 ::= SEQUENCE {
   t-PollRetransmit-r12   T-PollRetransmit-r12,
   pollPDU-r12    PollPDU-r12,
   pollByte-r12   PollByte-r12,
   maxRetxThreshold-r12   ENUMERATED {t1, t2, t3, t4, t6, t8, t16, t32}
}

DL-AM-RLC-r12 ::= SEQUENCE {
   t-Reordering-r12    T-Reordering-r12,
   t-StatusProhibit-r12   T-StatusProhibit-r12
}

UL-UM-RLC-r12 ::= SEQUENCE {
   sn-FieldLength-r12   SN-FieldLength-r12
}

DL-UM-RLC-r12 ::= SEQUENCE {
   sn-FieldLength-r12   SN-FieldLength-r12,
   t-Reordering-r12    T-Reordering-r12
}

<SNIP>
```

FIG. 16

RRCConnectionReconfiguration MESSAGE

```
RRCConnectionReconfiguration ::= SEQUENCE {
    rrc-TransactionIdentifier   RRC-TransactionIdentifier,
    criticalExtensions   CHOICE {
        c1                 CHOICE{
            rrcConnectionReconfiguration-r8 RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture   SEQUENCE {}
    }
}

RRCConnectionReconfiguration-r8-IEs ::= SEQUENCE {
    measConfig MeasConfig   OPTIONAL,   -- Need ON
    mobilityControlInfo   MobilityControlInfo   OPTIONAL,   -- Cond HO
    dedicatedInfoNASList   SEQUENCE (SIZE(1..maxDRB)) OF
                                          DedicatedInfoNAS   OPTIONAL,   -- Cond nonHO
    radioResourceConfigDedicated   RadioResourceConfigDedicated
                                                          OPTIONAL,   -- Cond HO-toEUTRA
    securityConfigHO   SecurityConfigHO   OPTIONAL,   -- Cond HO
    nonCriticalExtension   RRCConnectionReconfiguration-v890-IEs   OPTIONAL
}
<SNIP>

RRCConnectionReconfiguration-v1130-IEs ::= SEQUENCE {
    systemInfomationBlockType1Dedicated-r11   OCTET STRING (CONTAINING
                                          SystemInformationBlockType1)   OPTIONAL,   -- Need ON
    nonCriticalExtension   RRCConnectionReconfiguration-v1200-IEs   OPTIONAL
}

RRCConnectionReconfiguration-v1200-IEs ::= SEQUENCE {
    secondaryConnectivityControlInfo-r12   SecondaryConnectivityControlInfo
                                                          OPTIONAL,   -- Need ON
    nonCriticalExtension   SEQUENCE {}   OPTIONAL   -- Need OP
}
<SNIP>
```

FIG. 17

SecondaryConnectivityControlInfo-r12 INFORMATION ELEMENT

```
SecondaryConnectivityControlInfo-r12 ::= SEQUENCE {
    secondaryPhysCellId-r12    PhysCellId-r12,
    carrierFreq-r12    CarrierFreqEUTRA-r12    OPTIONAL,    -- Cond toEUTRA
    carrierBandwidth-r12    CarrierBandwidthEUTRA-r12    OPTIONAL, --    Cond toEUTRA
    additionalSpectrumEmission-r12    AdditionalSpectrumEmission-r12    OPTIONAL,
                                                               -- Cond toEUTRA
    t304-r12    ENUMERATED {ms50, ms100, ms150, ms200, ms500, ms1000, ms2000, spare1},
    newUE-Identity-r12    C-RNTI,
    radioResourceConfigCommonSPCell-r12    RadioResourceConfigCommonSPCell-r12,
    radiorResourceConfigDedicatedSPCell-r12    RadioResourceConfigDadicatedSPCell-r12,
    rach-ConfigDedicated-r12    RACH-ConfigDedicated-r12    OPTIONAL,    -- Need OP
    ...
}

CarrierBandwidthEUTRA-r12 ::= SEQUENCE {
    dl-Bandwidth-r12    ENUMERATED {
                                n6, n15, n25, n50, n75, n100, spare10,
                                spare9, spare8, spare7, spare6, spare5,
                                spare4, spare3, spare2, spare1},
    ul-Bandwidth-r12    ENUMERATED {
                                n6, n15, n25, n50, n75, n100, spare10,
                                spare9, spare8, spare7, spare6, spare5,
                                spare4, spare3, spare2, spare1} OPTIONAL -- Need OP
}

CarrierFreqEUTRA-r12 ::= SEQUENCE {
    dl-CarrierFreq-r12    ARFCN-ValueEUTRA-r12,
    ul-CarrierFreq-r12    ARFCN-ValueEUTRA-r12    OPTIONAL    -- Cond FDD
}

}
```

# RADIO COMMUNICATION METHOD, RADIO COMMUNICATION SYSTEM, AND RADIO STATION

CROSS-REFERENCE TO RELATED APPLICATION

This application is a continuation application of International Application PCT/JP2013/003018 filed on May 10, 2013 and designated the U.S., the entire contents of which are incorporated herein by reference.

FIELD

The present invention relates to a radio communication method, a radio communication system, and a radio station.

BACKGROUND

Recently, in a radio communication system such as a mobile phone system (cellular system), the next generation radio communication technology has been discussed in order to achieve a further high speed and large capacity in radio communication. For example, in 3rd Generation Partnership Project (3GPP) which is a standardization organization, a communication standard referred to as Long Term Evolution (LTE) or a communication standard referred to as LTE-Advanced (LTE-A) based on the LTE radio communication technology is suggested.

The latest communication standard completed in 3GPP is Release 10 corresponding to the LTE-A, and has functions obtained largely by extending functions of Release 8 and Release 9 corresponding to the LTE. A discussion about the main parts of Release 11 obtained by further extending Release 10 has been presently ended, and detailed parts for completion have been finished. Additionally, a discussion about Release 12 has been started. "LTE" is added to the LTE and the LTE-A, and includes other radio communication systems obtained by extending the LTE and the LTE-A, as long as there is no particular separation.

Release 12 of 3GPP includes various technologies, and there is a small cell as one of these technologies. The small cell is a relatively small cell and a concept competing with a macro cell which is relatively large cell. The macro cell is formed by a relatively large radio base station, but the small cell is formed by a relatively small radio base station. Here, a "cell" is a term indicating a range which is covered by a radio base station in order to cause a radio terminal to transmit and receive a radio signal. However, the radio base station and the cell are concepts which almost correspond to each other, and thus a "cell" and a "radio base station" can be appropriately changed and read in the description of this application.

Effects obtained by introducing a small cell are considered. For example, a small cell is disposed at a location such as a hot spot, which has heavy communication traffic, and thus it is possible to reduce a load of a macro cell. If the radio terminal transmits a signal to a small cell which is nearer than a macro cell far away, it is possible to suppress an increase of transmission power and an effect in that good communication characteristics are obtained can be also expected. The small cell is considered as a component technology which can solve various problems included in the current or the future radio communication system, and will be continuously discussed as a promising technology in 3GPP.

In 3GPP, as one of the technologies associated with the small cell, a study of dual connectivity has been started. In the dual connectivity, a radio terminal is connected to a plurality of radio base stations and simultaneously communicates with the plurality of radio base stations, and thus the radio terminal transmits or receives different information to or from the radio base stations at the same time.

FIG. 1 illustrates a conceptual diagram of the dual connectivity. As illustrated in FIG. 1, as one example of the dual connectivity, a case where a radio terminal (user equipment: UE) is connected to both of the macro cell and the small cell, and the like are considered when a plurality of small cells is disposed in a macro cell. For example, the dual connectivity enables the radio terminal to perform transmission and reception of different information with both of the macro cell and the small cell. Thus, it is possible to realize high-speed communication. A discussion regarding the dual connectivity has been just started in 3GPP. However, the dual connectivity allows the high speed and large capacity desired for future radio communication systems to be obtained, and thus it is expected that many discussions will be continuously repeated.

The dual connectivity is described in this application. However, a similar discussion can be performed in multiple connectivity of triple sources or more. Accordingly, the dual connectivity in this application may be recognized as a concept in which the multiple connectivity is included, and it is noted that the dual connectivity may be replaced with the multiple connectivity in this application.

CITATION LIST

Non Patent Literature

NPL 1: 3GPP TS36.300 V11.5.0 (2013-03)
NPL 2: 3GPP TS36.321 V11.1.0 (2013-01)
NPL 3: 3GPP TS36.322 V11.0.0 (2012-09)
NPL 4: 3GPP TS36.323 V11.1.0 (2013-01)
NPL 5: 3GPP TS36.331 V11.3.0 (2013-03)
NPL 6: 3GPP R2-130068 (2013-01)
NPL 7: 3GPP R2-131327 (2013-04)

SUMMARY

According to an aspect of the invention, a radio communication method includes transmitting first information from a first radio station to a second radio station before determining an activation of a second logical processing entity that is to be activated in a first processing layer of the second radio station in association with a first logical processing entity that has been activated in the first processing layer of the second radio station, the first information relating to the activation of the second logical processing entity, the first information being transmitted using a first control signal in a higher layer of the first processing layer, transmitting, when determining the activation of the second logical processing entity, second information for instructing the activation from the first radio station to the second radio station, the second information being transmitted using a second control signal in the first processing layer, and activating the second logical processing entity by the second radio station based on the first information in response to the second information, wherein the second information is transmitted using a reserved field or a reserved value in the second control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an RRCConnectionReconfiguration message in the LTE system.

FIG. 9 is a diagram illustrating a RadioResourceConfigDedicated information element of an RRC control signal in the LTE system.

FIG. 10 is a diagram illustrating an RLC-Config information element of the RRC control signal in the LTE system.

FIG. 11 is a diagram illustrating an example of an RRCConnectionReconfiguration message in the second embodiment.

FIG. 12 is a diagram illustrating an example of a RadioResourceConfigDedicated information element of an RRC control signal in the second embodiment.

FIG. 13 is a diagram illustrating an RLC-Config information element of the RRC control signal in the second embodiment.

FIG. 16 is a diagram illustrating another example of the RRCConnectionReconfiguration message in the second embodiment.

FIG. 17 is a diagram illustrating another example of the RadioResourceConfigDedicated information element of the RRC control signal in the second embodiment.

DESCRIPTION OF EMBODIMENTS

Figure 1:
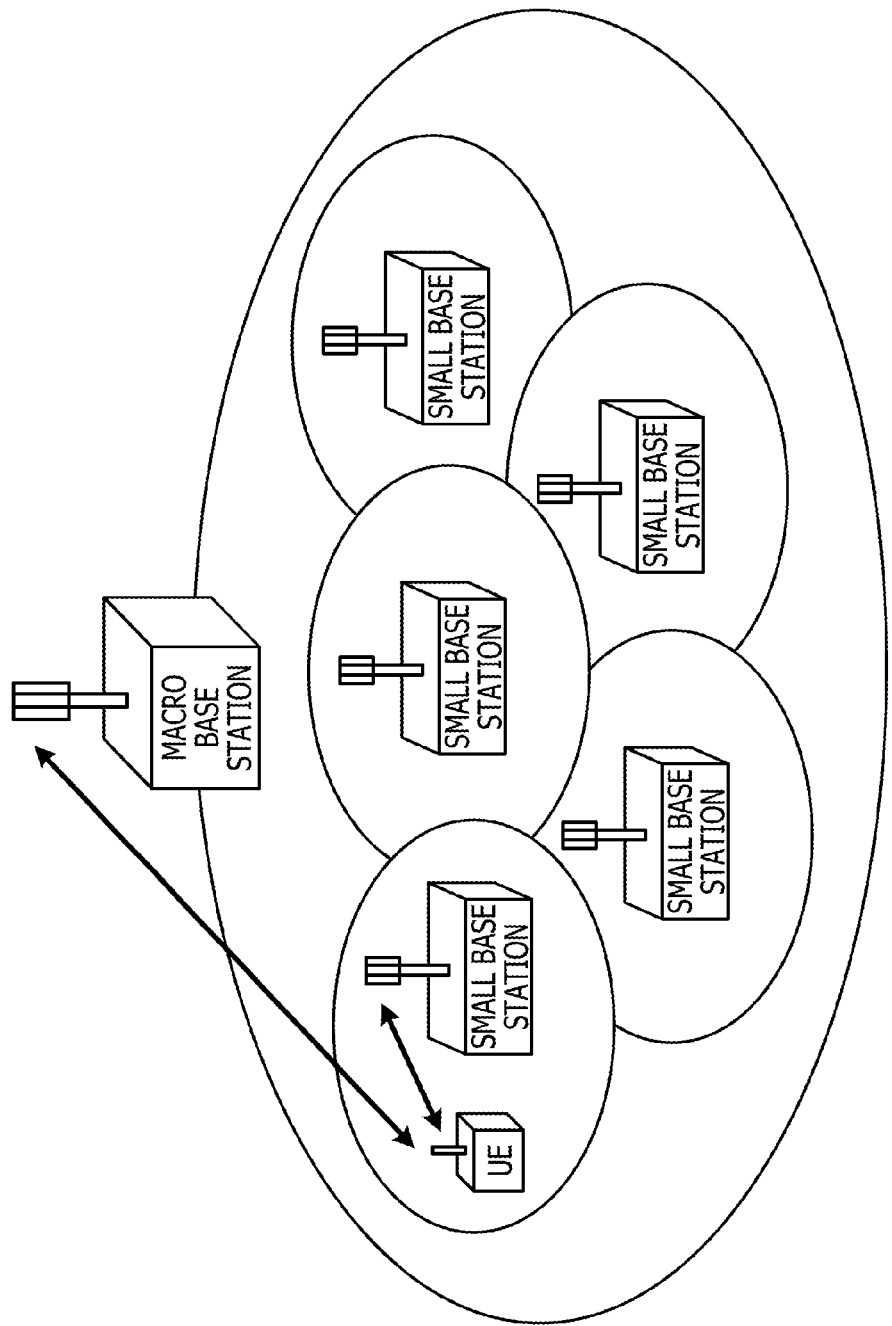
FIG. 1 is a diagram illustrating a concept of dual connectivity.

As described above, a discussion about the dual connectivity based on a small cell and the like has been started in 3GPP, but deeper discussion has been not performed yet. Accordingly, a probability of occurrence of a certain problem or inconvenience which is unknown to the world is considered when the dual connectivity is introduced into an LTE system and the like. Particularly, a study of signaling (signal transmitted or received for control) desired between a macro cell or a small cell and the radio terminal in order to realize the dual connectivity has hardly been performed. Accordingly, the signaling desired for realizing the dual connectivity based on a small cell and the like does not exist in the related art.

The descriptions for the above problem are made based on a small cell in the LTE system. However, this problem can be expanded to a general cell also including a macro cell. That is, signaling desired for causing the radio terminal to realize the dual connectivity with a plurality of cells does not exist in an LTE system of the related art.

Considering the above situations, an object of the technology of this disclosure is to provide a radio communication method, a radio communication system, and a radio station in which signaling desired when dual connectivity is realized can be performed.

Hereinafter, embodiments of a radio communication method, a radio communication system, a radio base station, and a radio terminal in this disclosure will be described using the accompanying drawings. For a convenient description, an individual embodiment will be described. However, the embodiments can be combined and thus it is possible to obtain an effect of combination and to improve availability.

[Where the Problem is]

First, a location of the problem in a technology of the related art will be described before each of the embodiments will be described. It is noted that the problem is newly founded as a result of closely examining the technology of the related art by the inventor and is not known in the past.

As described above, the signaling desired for realizing the dual connectivity of the radio terminal with the plurality of cells does not exist in the LTE system of the related art. Thus, it is examined whether the signaling desired for realizing the dual connectivity can be performed by using a technology already defined in the LTE system of the related art.

First, carrier aggregation (CA) which is a technology defined in the LTE system of the related art will be examined. In the carrier aggregation, high speed and large capacity communication is realized by binding and using a plurality of component carriers (CC) which are frequency bands used in communication between a radio base station and a radio terminal, or a plurality of cells. A bandwidth supported in the LTE system is limited up to a maximum of 20 MHz. However, for example, two CCs of 20 MHz are bound by introducing the carrier aggregation, and thus a 40 MHz bandwidth can be used.

In a framework of the carrier aggregation, it seems that, for example, the macro cell uses one CC and the small cell uses another CC, and thus the dual connectivity can be realized. However, it is considered that realizing of the dual connectivity based on the carrier aggregation is difficult due to reasons which will be described next.

Here, the carrier aggregation is considered in a view of a protocol stack in the LTE system. The protocol stack of the LTE system is configured by a PHYsical (PHY) layer, a media access control (MAC) layer, a Radio Link Control (RLC) layer, and a Packet Data Convergence Protocol (PDCP) layer in order from a lower layer (here, the presence of a higher class will be omitted). If the protocol stack of the LTE system corresponds to the Open Systems Interconnection (OSI) reference model which has been conventionally used, the physical layer in the LTE system corresponds to a physical layer which is a first layer of the OSI reference model. The MAC layer, the RLC layer, and the PDCP layer in the LTE system correspond to a data link layer which is a second layer of the OSI reference model. The MAC layer is in charge of a scheduler function and the like. The RLC layer is in charge of sequence control and the like. The PDCP layer is in charge of security and the like.

When the carrier aggregation is considered in view of the protocol stack, it is said that data to be transmitted is divided in the physical layer. It is said that data to be received is collected in the physical layer. This means that a plurality of entities of the physical layer and one entity of the MAC layer and the like which is a higher layer are on both of a transmission side and a reception side and one entity in the carrier aggregation. Here, the entity is a term referring to a processing entity. The entity exists in each layer of the protocol stack and, the entity is not limited to being one-to-one for a device and can be N-to-one for a device. For example, as described above, according to the carrier aggregation, the plurality of entities of the physical layer is on both of the transmission side and the reception side.

Figure 2:
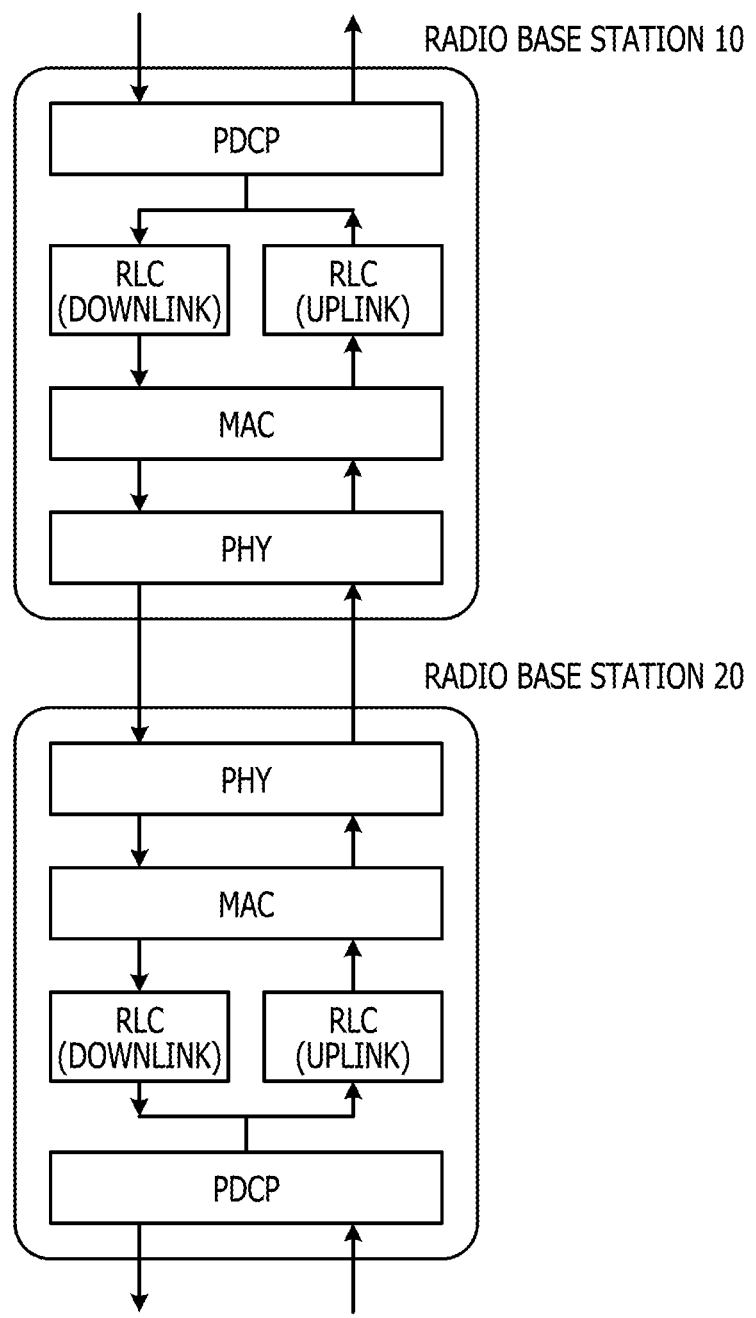
FIG. 2 is a diagram illustrating a protocol stack of general data communication in an LTE system.

FIG. 2 illustrates a protocol stack in general data communication (when the carrier aggregation is not used) of the LTE system. Each rectangle indicates an entity and entities of the physical layer, the MAC layer, the RLC layer, and the PDCP layer are activated in one line of series between the radio base station and the radio terminal. In FIG. 2, only RLC entities are individually an uplink RLC entity and a downlink RLC entity, and this is because a configuration is obtained based on specifications of 3GPP. Specifically, in downlink data communication, a configuration is made such that an uplink RLC entity is individually accompanied in order to transmit and receive data transmitted by a downlink RLC entity.

Figure 3:
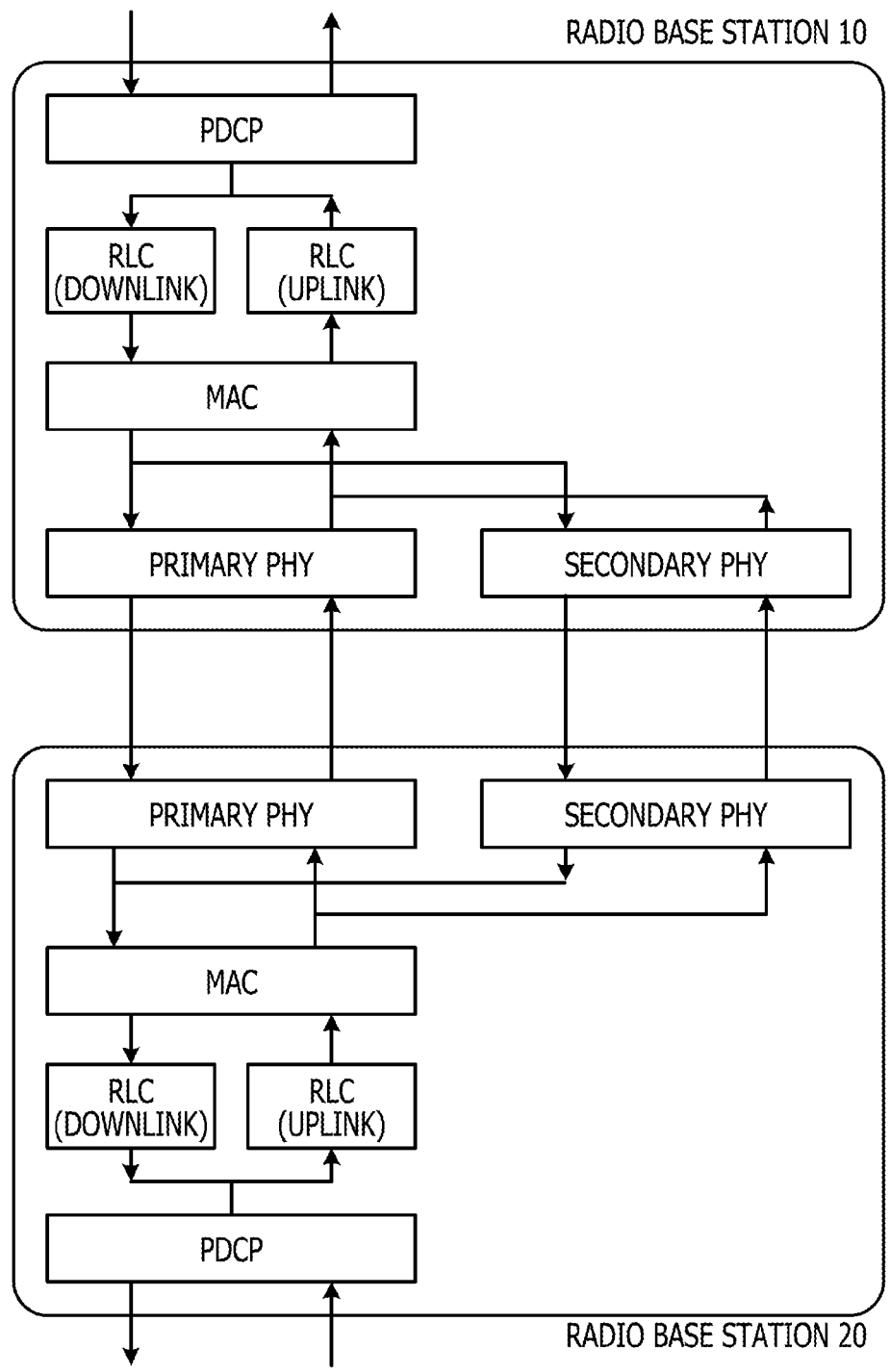
FIG. 3 is a diagram illustrating a protocol stack of data communication based on carrier aggregation in the LTE system.

On the contrary, FIG. 3 illustrates a protocol stack in data communication based on the carrier aggregation, in the LTE system. Entities of the physical layer, the MAC layer, the RLC layer, and the PDCP layer are also activated between the radio base station and the radio terminal in FIG. 3. However, FIG. 3 is different from FIG. 2 in that only the physical layer is divided into two entities. In this manner, if the carrier aggregation is viewed from a viewpoint of the protocol stack, the carrier aggregation is said to perform separation of data to be transmitted, in the physical layer and to perform aggregation of received data in the physical layer.

As described above, the MAC layer in the LTE system is in charge of the scheduler function. The scheduler function is a function of determining a timing and a frequency used in transmission of data. A case where one entity of the MAC layer is used in the carrier aggregation is described above, and this means one scheduler.

If the dual connectivity is realized in the carrier aggregation, for example, a MAC entity (scheduler) in a macro radio base station performs scheduling for a physical entity (CC or cell) which is in each of the macro radio base station and a small radio base station. Realizing this is difficult due to a problem of latency in communication between the radio base stations. Scheduling in the LTE system is desired to be performed in a significantly short period which uses one millisecond (one sub-frame) as a unit. Thus, according to the carrier aggregation, it is considered that one radio base station can perform transmission and reception by using a plurality of carriers, but actually a plurality of radio base stations does not perform transmission and reception by using a plurality of carriers.

From the above descriptions, it is considered that realizing of the dual connectivity based on the carrier aggregation is very difficult.

If a consideration relating to the carrier aggregation described above is used as a base, data is desired to be divided in a data link layer on the physical layer, in order to realize the dual connectivity. As described above, in the LTE system, the data link layer is subdivided into three layers of the MAC layer, the RLC layer, and the PDCP layer. For example, if data is divided in the MAC layer, a plurality of entities of the MAC layer exists. Thus, a plurality of schedulers exists, and thus, for example, the macro radio base station and the small radio base station can include an individual scheduler. Accordingly, it is possible to avoid the above-described problem based on the latency in the communication between the radio base stations, and to realize the dual connectivity by dividing data in the MAC layer. Similarly to this, when data is divided in the RLC layer or the PDCP layer, the dual connectivity can be also realized.

Attention has to be paid to the fact that division of data in the data link layer is not equivalent to the dual connectivity. This is because there is also a case where one-source connection is performed even though data is divided in the data link layer, such as a case where one radio base station has a plurality of MAC entities.

Next, processing sequences and signaling for dividing data in the data link layer for the dual connectivity will be examined.

For example, it is considered that processing sequences and signaling used when handover in the related art is performed are used for dividing data in the data link layer. In the handover, the radio terminal releases connection with a serving radio base station (handover source radio base station) and is connected to a target radio base station (handover destination radio base station). At this time, if the radio terminal does not release the connection with the serving radio base station, there is a probability of enabling realization of the dual connectivity. Accordingly, it also seems that division of data in the data link layer, which is represented by the dual connectivity, can be performed in accordance with processing at a time of the handover in the related art.

Specifically, the following method is considered. First, it is determined that the dual connectivity is started in a macro cell. This determination can be performed by detecting the occurrence of a predetermined event such as an increase of a processing load, for example. It is considered that the macro cell at this time can realize the dual connectivity by using processing sequences and signaling similar to those performing handover on a radio terminal to a small cell.

Here, at a time of handover, transmission of a handover instruction to the radio terminal from the serving radio base station (handover source radio base station), or a handover completion notification from the radio terminal to the target radio base station (handover destination radio base station) is performed by using a Radio Resource Control (RRC) signal. The RRC signal is a control signal in an RRC layer which is a higher layer of the data link layer. The RRC layer in the LTE system corresponds to a network layer which is the third layer of the OSI reference model. Accordingly, the RRC signal is referred to as an L3 (Layer 3) signal. The RRC signal is transmitted upwardly (direction from the radio terminal to the radio base station) in addition to being transmitted downwardly (direction from the radio base station to the radio terminal).

The RRC signal is widely used in transmission and reception of various parameters and the like between the radio base station and the radio terminal, regardless of processing at a time of handover. The RRC signal has advantages in that expansibility is high and many parameters can be transmitted and received flexibly. However, there is a problem in the RRC signal in that a period of time is desired for transmission or reception processing. Since the RRC signal is a signal of a higher layer, the RRC signal is approximate to normal user data in the transmission or reception processing. Accordingly, the RRC signal is generally inappropriate for a case of desiring immediacy.

Here, a case where the dual connectivity is realized by using the processing sequences and signaling in the handover of the related art as described above is considered. At this time, since starting of the dual connectivity is determined (a predetermined event is detected), processing for the handover is performed. Here, as described above, twice transmission and reception of the RRC signal is included in handover processing. Specifically, transmission and reception of an RRC signal for a handover instruction and an RRC signal for a handover completion notification has to be performed. Thus, a period of time from when starting of the dual connectivity is determined until the dual connectivity is started is delayed.

If such delay occurs, for example, when a load of the macro radio base station increases, since rapidly performing of load balancing (off-load) for the small radio base station is impossible and this is linked to delay of solving a problem, occurrence of inconvenience is considered. For example, since the load of the macro radio base station increases, starting of the dual connectivity is determined, but the load of the macro radio base station can be decreased at a point of time when the dual connectivity is started. Since the above method causes un-necessity of such processing, it seems that the above method is not preferable.

Accordingly, dividing of data (dual connectivity) in the data link layer based on the processing sequences and signaling of the handover is considered to not be desired in view of immediacy or timeliness. Consequently, this problem results from performing division of data (dual connectivity) in the data link layer by using an RRC signal. Thus, it is determined that it is difficult to avoid this problem using a signal other than the RRC signal.

For example, when data is divided in the MAC layer, a method of using a control packet of the MAC layer, which is defined in the LTE system is considered. The control packet is also defined in the RLC layer or the PDCP layer. Since the control signals of the data link layer are control signals of a lower layer, there is an advantage in that processing delay in transmission and reception is small in comparison to the RRC signal. Accordingly, in the sequences of handover processing described above, if the control signal of the data link layer is used instead of the handover instruction and the handover completion notification which is performed by using the RRC signal, the above-described delay problem does not occur and thus obtaining of good convenience is considered.

However, the control packet of the data link layer has problems in that high expansibility which is obtained in the RRC signal is not obtained and alteration is not easy. From a viewpoint of compatibility and the like with LTE which is a conventional system, there is a circumstance in which the control packet of the lower layer such as the data link layer is altered as little as possible. Accordingly, transmitting of many pieces of information such as the handover instruction and the handover completion notification in the related art by using the control packet of the data link layer is unrealistic. Accordingly, it is considered that dividing of data (dual connectivity) in the data link layer by using the control packet of the data link layer is difficult.

In the above descriptions, activation is performed based on the dual connectivity between the macro radio base station (macro cell) and the small radio base station (small cell) in the LTE system. However, it is noted that an application range of the invention in this application is not limited thereto and can be expanded to a general radio base station (cell). For example, the invention in this application can be also applied to a master cell and a slave cell, to an anchor cell and an assisting cell, and to a primary cell and a secondary cell. It is noted that a method of calling each of the cells (radio base stations) in this application is not limited to the above descriptions. Generally, if a radio base station to which both of a control plane and a data plane are connected and which performs communication is performed is set to a principle radio base station, and a radio base station to which an additional data plane is connected and which performs communication is set to a subordinate radio base station as in an LTE communication system of the related art, various appellation can be used in a range without departing from this intention.

Summarizing the above descriptions, dividing of data in the data link layer is desired for performing the dual connectivity. In order to realize this, a delay problem occurs when the RRC signal is used, and a problem of expansibility occurs when the control signal of the data link layer is used. Thus, employing of either of the methods is difficult. Accordingly, sequences and signaling for solving these problems are desired for dividing data in the data link layer. Since these problems are found as a result of closely examining the technology in the related art by the inventor, these problems have been unknown in the related art. The embodiments of this application for solving these problems will be described in order.

First Embodiment

In a first embodiment, for example, a radio base station transmits information regarding an L2 entity to be added to a radio terminal in advance by using an L3 control signal, and transmits information for an instruction of performing activation by using an L2 control signal when the L2 entity is activated. In other words, according to the first embodiment, there is provided a radio communication method including: transmitting first information from a first radio station to a second radio station before determining an activation of a second logical processing entity that is to be activated in a first processing layer of the second radio station in association with a first logical processing entity that has been activated in the first processing layer of the second radio station, the first information relating to the activation of the second logical processing entity, the first information being transmitted using a first control signal in a higher layer of the first processing layer, transmitting, when determining the activation of the second logical processing entity, second information for instructing the activation from the first radio station to the second radio station, the second information being transmitted using a second control signal in the first processing layer, and activating the second logical processing entity by the second radio station based on the first information in response to the second information.

Figure 4:
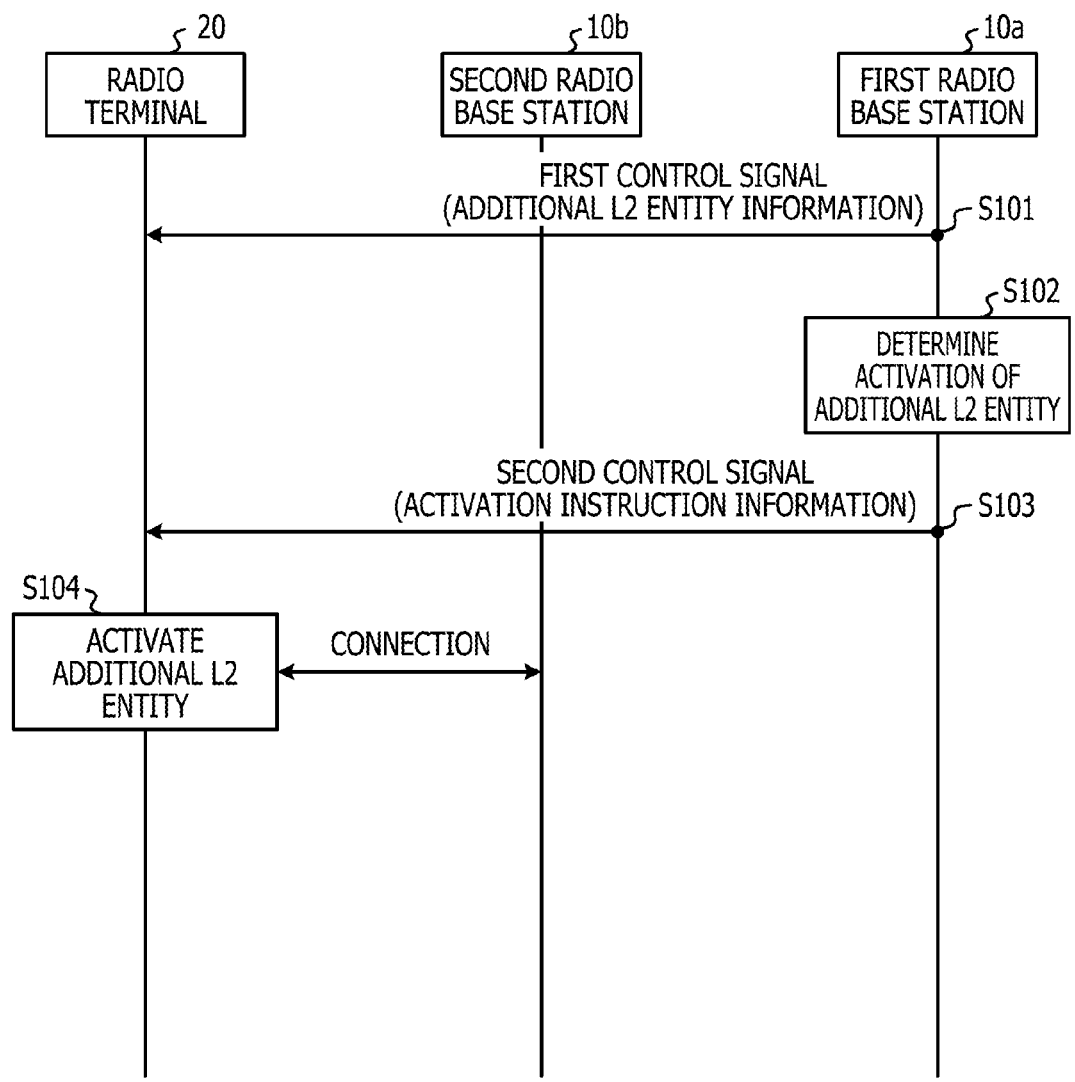
FIG. 4 is a diagram illustrating an example of processing sequences of a radio communication system according to a first embodiment.

FIG. 4 illustrates an example of processing sequences according to the first embodiment. In the first embodiment, there are a radio terminal 20, a first radio base station 10a, and a second radio base station 10b. As a typical example of FIG. 4, a case where the first radio base station 10a is a macro radio base station 10 and the second radio base station 10b is a small radio base station 10 is considered. However, the first radio base station 10a can be the small radio base station 10. The second radio base station 10b can be the macro radio base station 10. In a case of being simply referred to as a radio base station 10 in description for FIG. 4, the first radio base station 10a and the second radio base station 10b are collectively referred to as the radio base station 10.

Some premises of the first embodiment illustrated in FIG. 4 will be described. In FIG. 4, the radio terminal 20 has been already connected to the first radio base station 10a. Here, "connection of the radio terminal 20 to the radio base station 10" indicates a state where data can be transmitted and received between the radio terminal 20 and the radio base station 10 by obtaining synchronization with the radio base station 10 and completing desired setting in the radio terminal 20. The radio terminal 20 is not connected to the second radio base station 10b.

When the radio terminal 20 is connected to the radio base station 10, a logical communication line formed from a plurality of classes is constructed between the radio terminal 20 and the radio base station 10. This logical communication line is referred to as a bearer. The logical communication line includes at least a physical layer which is a first layer (L1), a data link layer which is a second layer (L2), and a network layer which is a third layer (L3), from a lower part. This logical communication line is configured by a processing entity which is referred to as an entity activated in each of the classes. The entity performs processing in each of the classes and thus transmission processing or reception processing is realized. In this application, an L1 entity is referred to as a physical entity and entities of L2 or more are referred to as logical entities.

Specifically, regarding downlink data communication, in the radio base station 10, at least one of an L3 entity, an L2 entity, and an L1 entity on a transmission side is activated and thus data for a downlink is transmitted. In the radio terminal 20, at least one of an L3 entity, an L2 entity, and an L1 entity on a reception side is activated and thus data for the downlink is received. Regarding uplink data communication, in the radio terminal 20, at least one of an L3 entity, an L2 entity, and an L1 entity on the transmission side is activated and thus data for an uplink is transmitted. In the radio base station 10, at least one of an L3 entity, an L2 entity, and an L1 entity on a reception side is activated and thus data for the uplink is received.

As described above, one of the objects of this application is to perform dual connectivity. FIG. 4 illustrates an example of processing sequences when the radio terminal 20 realizes the dual connectivity of the first radio base station 10a and the second radio base station 10b. When the radio terminal 20 connected to the first radio base station 10a performs the dual connectivity, the radio terminal 20 has to add and activate an L2 entity, and cause the added L2 entity to perform transmission and reception with the second radio base station 10b. The processing sequences illustrated in FIG. 4 are used for realizing this. However, it is noted that this embodiment is not limited to realization of the dual connectivity, and can be also applied to a case where one radio base station 10 activates two L2 entities which are in parallel.

Figure 5:
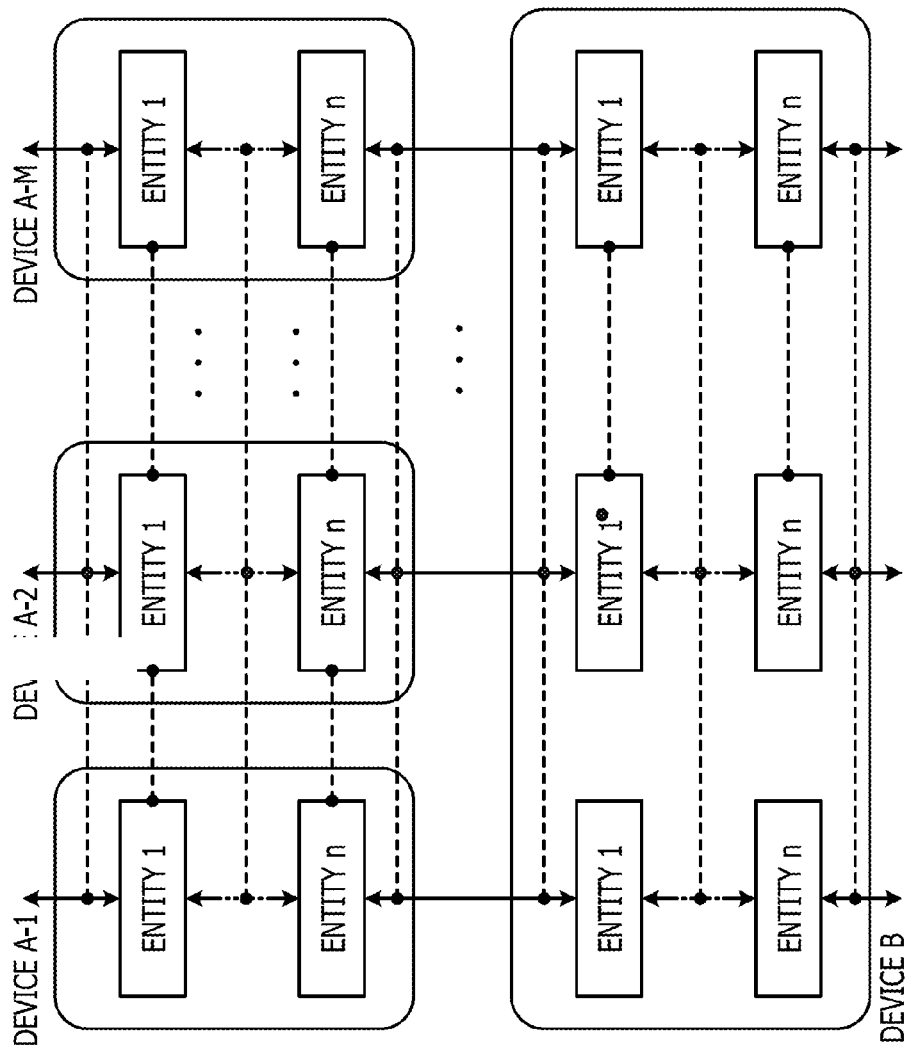
FIG. 5 is a diagram illustrating a protocol stack of data communication in the radio communication system according to the first embodiment.

Here, FIG. 5 is a diagram illustrating a protocol stack of data communication in the radio communication system according to the first embodiment. As illustrated in FIG. 5, the first embodiment is not limited to the dual connectivity, and can be applied to multiple connectivity of three sources or more (FIG. 5 illustrates M-access). Further, as illustrated in FIG. 5, the first embodiment can be applied to an uplink and a downlink. It is noted that there is an entity of two layers or more, which is included in a protocol stack (FIG. 5 illustrates an n-layer structure), in each device in the first embodiment. These characteristics are not limited to the first embodiment and similar characteristics are also obtained in other embodiments of this application.

Processes in FIG. 4 will be described with an order. In S101 of FIG. 4, the first radio base station 10a transmits information regarding an L2 entity to be added to the radio terminal 20 by using a first control signal. The radio terminal 20 receives the information regarding the L2 entity to be added from the radio base station 10 by using the first control signal. As the first control signal, an L3 control signal, for example, an RRC signal can be used.

The information regarding the L2 entity to be added (referred to as an additional L2 entity) is referred to as additional L2 entity information for a convenient description. The additional L2 entity information includes information to be used to activate the additional L2 entity. The additional L2 entity information includes at least information indicating the radio base station 10 in which the additional L2 entity is activated. The additional L2 entity information can include various types of information in addition to this information. For example, the additional L2 entity information can include information regarding a downlink frequency band or an uplink frequency band in the radio base station 10 in which the additional L2 entity is activated. The additional L2 entity information can include various parameters relating to processing (processing in the L2 layer) in the additional L2 entity.

In the example of FIG. 4, the first radio base station 10a selects the second radio base station 10b as the radio base station 10 for activating the additional L2 entity. The first radio base station 10a can select the radio base station 10 for activating the additional L2 entity, based on a certain reference. As an example, the first radio base station 10a can select the radio base station 10 which has relatively high reception power for the radio terminal 20. In S101 of FIG. 4, the information transmitted by the first radio base station 10a includes at least information indicating that the radio base station 10 for activating the additional L2 entity is the second radio base station 10b.

Although not illustrated in FIG. 4, the first radio base station 10a can notify the second radio base station 10b of a message that the second radio base station 10b is a communication partner of the L2 entity added to the radio terminal 20. Thus, the second radio base station 10b can figure out the presence of the radio terminal 20 in advance and perform smoothly subsequent processes.

In S102 of FIG. 4, it is determined that the first radio base station 10a activates the L2 entity (additional L2 entity) to be added. The first radio base station 10a can perform the determination in S102, based on a certain rule. As an example, it can be determined that the first radio base station 10a activates the additional L2 entity, when a load of the first radio base station 10a is equal to or greater than a predetermined value. As another example, the first radio base station 10a receives information indicating a load of the second radio base station 10b from the second radio base station 10b. When a difference between the load of the first radio base station 10a and the load of the second radio base station 10b is equal to or greater than a predetermined value, it can be determined that the first radio base station 10a activates the additional L2 entity.

Here, it is noted that the process of S102 in FIG. 4 is performed after the process of S101 is performed. That is, the process of S101 in FIG. 4 is performed before the process of S102 is performed. In other words, the first radio base station 10a transmits information regarding the additional L2 entity to the radio terminal 20 by using the L3 control signal in S101 of FIG. 4 before the additional L2 entity is activated in S102.

According to the above descriptions, it is determined that the first radio base station 10a causes the L2 entity (additional L2 entity) to be activated in the radio terminal 20, in S102. However, the determination in S102 may be determination of activating the L2 entity in the second radio base station 10b. The determination in S102 may be determination of activating the L2 entity in both of the radio terminal 20 and the second radio base station 10b.

The first radio base station 10a in S103 transmits information which is related to the additional L2 entity transmitting the information in S101 and is used for an instruction of performing activation to the radio terminal 20 by using a second control signal. The radio terminal 20 receives the information which is related to the additional L2 entity receiving the information in S101 and is used for an instruction of performing activation from the radio base station 10 by using the second control signal. As the second control signal, an L2 control signal, for example, a MAC control packet (MAC control protocol data unit (PDU)), an RLC control packet (RLC control PDU), a PDCP control packet (PDCP control PDU), and the like can be used.

Here, it is noted that the L2 control signal in S103 can include the information (referred to as activation instruction information for convenience of description) which is related to the additional L2 entity transmitting the information in S101 and is used for an instruction of performing activation. The activation instruction information can be also realized by using one bit. However, the activation instruction information can be realized by using a predetermined bit string. The activation instruction information may be stored to a new field prepared in the conventional L2 control signal, or may be stored to a reserved bit of the conventional L2 control signal. As an example, it is considered that the activation instruction information is realized by using one bit of the reserved bit included in the known L2 control signal.

Although not illustrated in FIG. 4, the first radio base station 10a can notify the second radio base station 10b of intent that the additional L2 entity is caused to be activated in the radio terminal 20. Thus, the second radio base station 10b can smoothly perform subsequent processes.

The radio terminal 20 activates the additional L2 entity in accordance with receiving of the activation instruction information in S103, in S104. At this time, the radio terminal 20 activates the additional L2 entity based on the additional L2 entity information received in S101. For example, as described above, the additional L2 entity information includes at least information indicating a radio base station 10 (second radio base station 10b in the example of FIG. 4) activated by the additional L2 entity. Thus, the radio terminal 20 can activate the additional L2 entity such that the radio base station 10 which is a connection destination of the additional L2 entity is set to be the second radio base station 10b. Accordingly, the radio terminal 20 is connected to the second radio base station 10b, and the dual connectivity is realized as a result.

For example, when the additional L2 entity information includes information regarding an uplink frequency band in the radio base station 10 activated by the additional L2 entity, random access can be performed on the radio base station 10 based on this information. For example, when the additional L2 entity information includes various parameters relating to processing (processing in the L2 layer) in the additional L2 entity, the additional L2 entity in which the parameters are set can be activated.

According to the processing sequences illustrated in FIG. 4, the radio terminal 20 can realize the dual connectivity with the first radio base station 10a and the second radio base station 10b. Dividing of data in the data link layer (adding of an entity in the data link layer) can be realized through processing sequences similar to those in FIG. 4.

In the following descriptions, work and effects of the processing sequences will be considered.

The activation instruction information in S103 is realized by using the L2 control signal, as described above. Since the L2 control signal is a control signal of the relatively lower layer, there is an advantage in that an amount of processing is small and the processing is performed at a high speed in comparison to the L3 control signal which is a control signal of the higher layer. The activation instruction information in S103 is realized by using the L2 control signal, and thus the additional L2 entity can be rapidly activated in S104 after it is determined in S102 that activation of the additional L2 entity is started.

As described above, since the activation instruction information has small information content (can be realized by using one bit), the activation instruction information can be transmitted by using the reserved bit of the L2 control signal, and the like. As described above, since a change in the L2 control signal has to be avoided as much as possible, it is considered that such a realization form is desired.

As a reaction of the small information content of the activation instruction information, the additional L2 entity information which has been transmitted in advance by using the L3 control signal necessarily has relatively large information content. However, as described above, the L3 control signal has high expansibility, and thus it is considered that there is hardly a harmful influence due to the large information content.

As described above, the L3 control signal has a disadvantage in that processing has a heavy amount and a long period of time is used for transmission and reception. However, as described above, the additional L2 entity information transmitted by using the L3 control signal is transmitted beforehand (before starting of activation of the additional L2 entity is determined) to the radio terminal 20 from the radio base station 10. Accordingly, it is considered that a problem such as the necessity of a period of time from when activation of the additional L2 entity is determined until activation is performed does not occur.

Accordingly, the processing sequences in the first embodiment illustrated in FIG. 4 become a method in which the L2 control signal and the L3 control signal are properly used and thus mutual insufficiency can be complemented and advantages can be shared.

According to the first embodiment described above, at least either of the delay problem due to the L3 control signal and the problem of expansibility due to the L2 control signal can be solved and dividing of data in the data link layer, which is starting of the dual connectivity can be realized. Accordingly, in the first embodiment, a new effect is obtained in which switching of the dual connectivity (division of data in the data link layer) having a high speed and compatibility can be realized, which is not obtained in the conventional technology.

Second Embodiment

A second embodiment is obtained by applying the first embodiment to the LTE system. Specifically, the L2 entity (processing entity) in the first embodiment is changed to an RLC entity, the first control signal is changed to an RRC signal, and the second control signal is changed to an RLC control packet. That is, in the second embodiment, a plurality of RLC entities is activated and thus data is divided in the RLC layer so as to realize the dual connectivity and the like.

Figure 6:
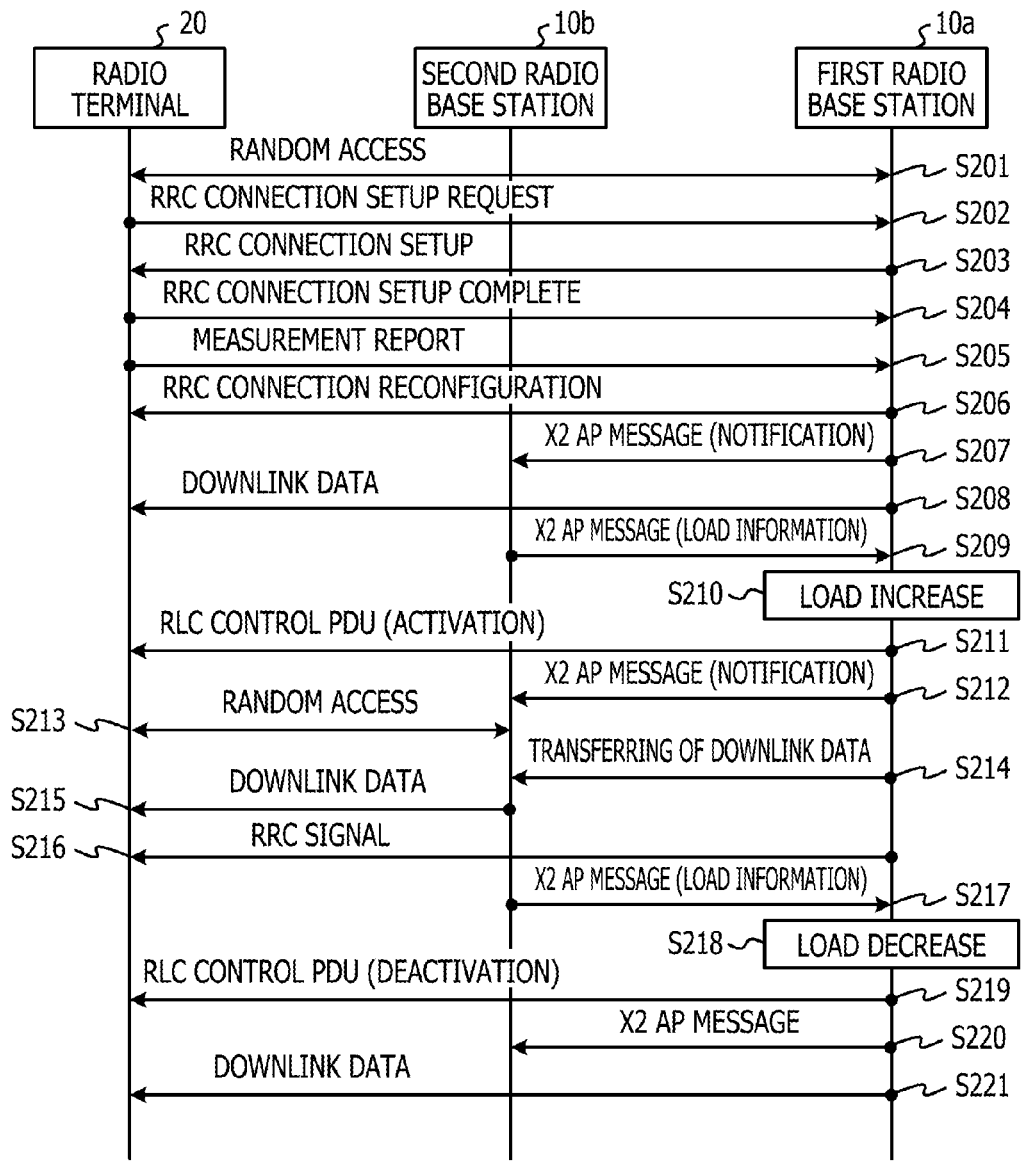
FIG. 6 is a diagram illustrating an example of processing sequences of a radio communication system according to a second embodiment.

FIG. 6 illustrates an example of processing sequences according to the second embodiment. Similarly to the first embodiment, there are a radio terminal 20, a first radio base station 10a, and a second radio base station 10b in the second embodiment. As a typical example, a case where the first radio base station 10a is a macro radio base station 10 and the second radio base station 10b is a small radio base station 10 is considered. However, the first radio base station 10a can be the small radio base station 10, and the second radio base station 10b can be the macro radio base station 10.

Some premises of the second embodiment illustrated in FIG. 6 will be described. In FIG. 6, the radio terminal 20 is connected to neither of the first radio base station 10a and the second radio base station 10b. Here, "connection of the radio terminal 20 to the radio base station 10" indicates a state where data can be transmitted and received between the radio terminal 20 and the radio base station 10 by obtaining synchronization with the radio base station 10 and completing desired setting in the radio terminal 20. In the LTE system, such a connection state is referred to as an RRC_CONNECTED state. A state where the radio terminal 20 is not connected to the radio base station 10 is referred to as an RRC_IDLE state.

When the radio terminal 20 is connected to the radio base station 10, a logical communication line formed from a plurality of classes is constructed between the radio terminal 20 and the radio base station 10. This logical communication line is referred to as a bearer. In the LTE system, a Data Radio Bearer (DRB) and a Signalling Radio Bearer (SRB) which are two types of bearers are defined. The DRB corresponds to a so-called user plane (data plane) which is referred to as a U-Plane, and is a logical communication line used in transmission and reception of user data. The SRB corresponds to a so-called control plane which is referred to as a C-plane, and is a logical communication line used in transmission and reception of an RRC signal which is an L3 signal.

The U-Plane (DRB) or the C-Plane (SRB) is configured by a hierarchical protocol stack (protocol layer). In the following descriptions, a protocol stack of the U-Plane will be described as an example. However, similar descriptions can be also made in a case of the C-Plane.

The protocol stack of the U-Plane includes at least a physical layer which is a first layer (11), a data link layer which is a second layer (L2), and a network layer which is a third layer (L3), from a lower part. The data link layer is classified into a media access control (MAC) layer, a Radio Link Control (RLC) layer, and a Packet Data Control Protocol (PDCP) layer from a lower part. The MAC layer is in charge of a scheduler function and the like. The RLC layer is in charge of sequence control and the like. The PDCP layer is in charge of security and the like.

The protocol stack of the U-Plane (DRB) is configured by a logical (or virtual) processing entity which is referred to as an entity activated in each of the classes. The entity performs processing in each of the classes and thus transmission processing or reception processing is realized.

Figure 7:
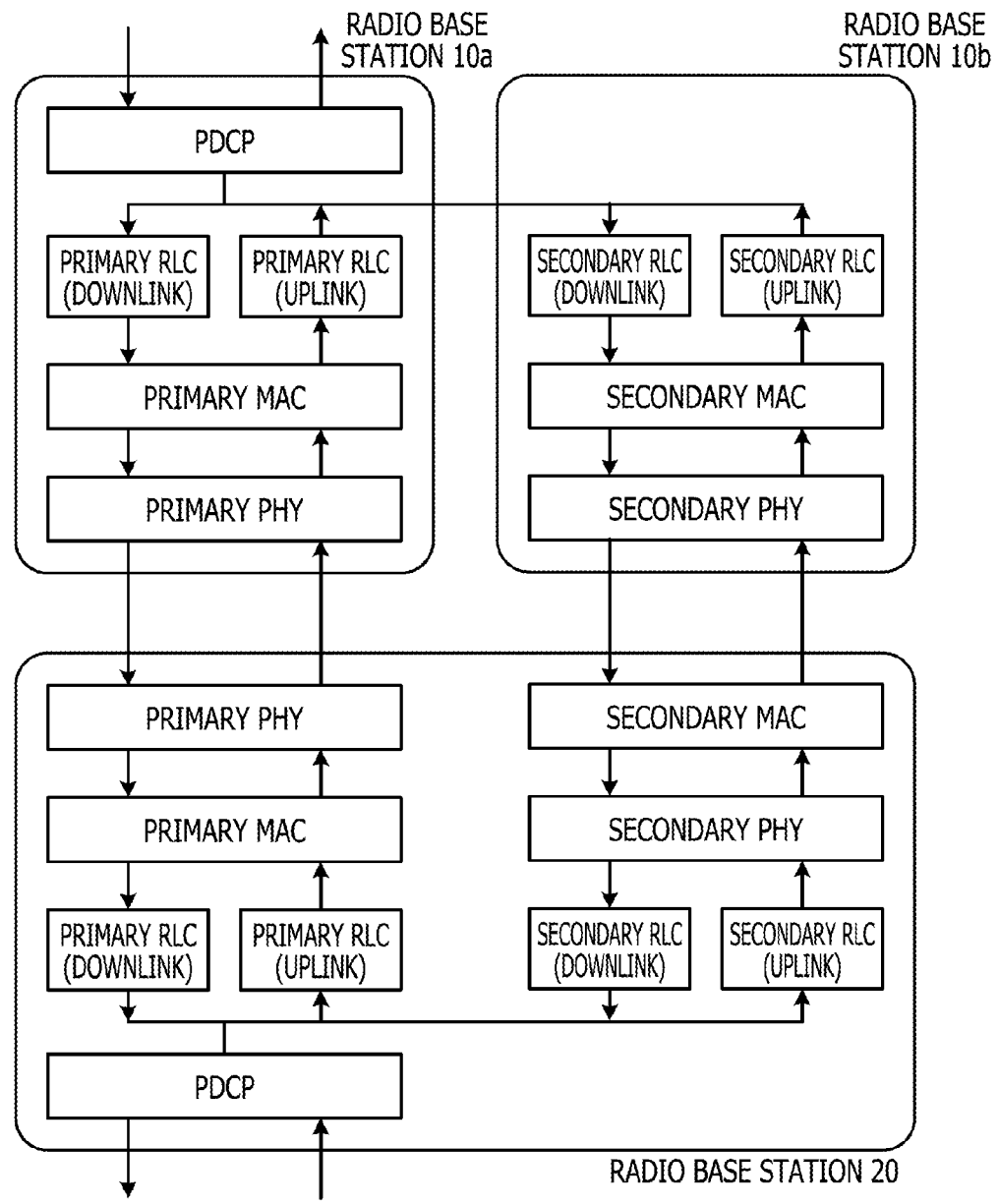
FIG. 7 is a diagram illustrating a protocol stack of data communication in the radio communication system according to the second embodiment.

FIG. 7 illustrates an example of the protocol stack of the U-Plane according to the second embodiment. As described in the beginning, in the second embodiment, a plurality of RLC entities is activated, and thus data is divided in the RLC layer so as to realize the dual connectivity and the like. FIG. 7 illustrates entities activated by the first radio base station 10a (for example, macro radio base station 10) and the second radio base station 10b (for example, small radio base station 10). A PDCP entity is activated by only the first radio base station 10a. On the contrary, an RLC entity, a MAC entity, and a physical entity are activated by each of the first radio base station 10a and the second radio base station 10b. In this manner, data can be divided in the RLC layer so as to realize the dual connectivity and the like by activating a plurality of RLC entities.

In FIG. 7, only RLC entities are individually an uplink RLC entity and a downlink RLC entity, and this is because a configuration is obtained based on specifications of 3GPP. FIG. 7 illustrates a case of one physical entity activated by the radio base station 10. However, a plurality of physical entities can be activated by applying the carrier aggregation. In this application, there is a case where an RLC entity activated by the first radio base station 10a is referred to as a primary RLC entity, and an RLC entity activated by the second radio base station 10b is referred to as a secondary RLC entity.

As described above, one of the objects of this application is to perform dual connectivity. FIG. 6 illustrates an example of processing sequences when the radio terminal 20 realizes the dual connectivity with the first radio base station 10a and the second radio base station 10b. FIG. 7 illustrates a protocol stack for realizing the dual connectivity. However, it is noted that this embodiment is not limited to realization of the dual connectivity and can be also applied to a case where one radio base station 10 activates a plurality of uplink (downlink) RLC entities.

Processes in FIG. 6 will be described with an order. In S201 to S204 of FIG. 6, the radio terminal 20 is connected to the first radio base station 10a and is transitioned to an RRC_CONNECTED state which is a connection state of enabling transmission and reception of data. Specifically, the radio terminal 20 performs random access between the radio terminal 20 and the first radio base station 10a in S201. Thus, the radio terminal 20 establishes an uplink synchronization between the radio terminal 20 and the first radio base station 10a. Then, the radio terminal 20 transmits an RRCConnectionSetupRequest message which is an RRC signal for desiring setup of a connection state to the first radio base station 10a in S202. The first radio base station 10a transmits an RRCConnectionSetup message which is an RRC signal for performing the setup of the connection state on the radio terminal 20 to the radio terminal 20 in S203. The RRCConnectionSetup message includes various parameters desired for transition of the radio terminal 20 to the RRC_CONNECTED state. The radio terminal 20 transmits an RRCConnectionSetupComplete message which is an RRC signal indicating intent that the setup of the connection state is completed to the first radio base station 10a in a state where the setup of the connection state (RRC_CONNECTED state) has been performed, in S204. The processes of S201 to S204 are connection processes itself executed in a general LTE system, and thus detailed descriptions will be omitted herein.

The radio terminal 20 performs transition to the RRC_CONNECTED state through the processes of S201 to S204, and thus establishes a U-Plane (DRB) and a C-Plane (SRB) between the radio terminal 20 and the first radio base station 10a. In the U-Plane or the C-Plane, as described above, the physical entity, the MAC entity, the RLC entities (uplink and downlink), and the PDCP entity from a lower part are respectively activated. With this, the radio terminal 20 can perform transmission and reception of user data between the radio terminal 20 and the first radio base station 10a through the U-Plane. The radio terminal 20 can perform transmission and reception of various RRC signals between the radio terminal 20 and the first radio base station 10a through the C-Plane. There are three types of SRBs, and among the three types of SRBs, an SRB established after S201 to S204 is SRB2. SRB0 or SRB1 is established before S201 to S204, and thus some RRC signals (for example, S202 to S204) can be transmitted and received. However, detailed descriptions will be omitted herein.

Then, the radio terminal 20 transmits a measurement report which is a measurement result of the neighboring cell to the first radio base station 10a in S205 of FIG. 6. If the radio terminal 20 is connected to the first radio base station 10a (performs transition to the RRC_CONNECTED state), the radio terminal 20 regularly measures reception power and the like from an adjacent cell and notifies the first radio base station 10a. This measurement report is used in selection of the radio terminal 20 as a handover destination radio base station 10, for example. The first radio base station 10a performs an instruction of one adjacent cell or more which are measured by the radio terminal 20, in advance by using an RRCConnectionReconfiguration message (not illustrated). When the first radio base station 10a is a macro radio base station 10, the small radio base station 10 constituting a small cell which is disposed in a macro cell configured by the first radio base station 10a can be included as an adjacent cell measured by the radio terminal 20.

The first radio base station 10a determines a radio base station 10 for activating an RLC entity to be added, based on the measurement report received in S205 and instructs the radio terminal 20 of addition of the RLC entity in S206. This determination corresponds to determination of the radio base station 10 which is used as one connection destination in the dual connectivity performed by the radio terminal 20. For example, the first radio base station 10a can determine a small radio base station 10 which has the maximum reception power in the received measurement report as a radio base station 10 for activating an RLC entity to be added. In the example of FIG. 6, the second radio base station 10b (for example, one of small radio base stations 10 which are subordinates of the first radio base station 10a being a macro radio base station 10) is set as the radio base station 10 for activating an RLC entity to be added.

The instruction in S206 can be performed by using an RRCConnectionReconfiguration message which is an RRC signal for resetting various parameters for the radio terminal 20 in the RRC_CONNECTED state, for example. The RRCConnectionReconfiguration message defined in 3GPP includes a RadioResourceConfigDedicated information element. The RadioResourceConfigDedicated information element includes an RLC-Config information element. One RLC-Config information element for a DRB (U-Plane) and one RLC-Config information element for an SRB (C-Plane) are set in the RadioResourceConfigDedicated information element. The RLC-Config information element can store information regarding an RLC entity (secondary RLC entity) to be added.

Here, for comparison, FIG. 8 illustrates (excerpts) an RRCConnectionReconfiguration message in the conventional LTE system. FIGS. 9 and 10 illustrate (respectively excerpt) a RadioResourceConfigDedicated information element and an RLC-Config information element in the conventional LTE system. It is noted that even when a parameter is the same or an information element is the same, a difference of an upper case and a lower case of an English letter, or a difference of the presence and the absence of a space, and the like is included in a parameter name or an information element name, in FIGS. 11 to 13 (which will be described later) in addition to these drawings.

A parameter group relating to a connection configuration which is defined in Releases (versions) of 3GPP is stored with an embedded structure in the conventional RRCConnectionReconfiguration message illustrated in FIG. 8. For example, as illustrated in FIG. 8, the RRCConnectionReconfiguration message includes RRCConnectionReconfiguration-r8-IEs which is an information element including a parameter group which is defined in Release 8 of 3GPP. As illustrated in FIG. 8, RRCConnectionReconfiguration-r8-IEs includes RRCConnectionReconfiguration-r890-IEs which is an information element including a parameter group which is defined in Release 8 (version 8.90) of 3GPP. Although being omitted in FIG. 8, the parameter group relating to the connection configuration which is defined in Releases (versions) of 3GPP is stored in an embedded structure. As illustrated in FIG. 8, RRCConnectionReconfiguration-r1130-IEs which is an information element including a parameter group which is defined by Release 11 (version 11.30) of 3GPP is the deepest element in the embedded structure when this application is filed.

Here, RRCConnectionReconfiguration-r8-IEs described above includes a RadioResourceConfigDedicated (radioResourceConfigDedicated) information element corresponding to an individual configuration parameter group of a radio resource as illustrated in FIG. 8. As illustrated in FIG. 9, the conventional RadioResourceConfigDedicated information element includes a DRB-ToAddMod information element for performing a configuration relating to a DRB, and an SRB-ToAddMod information element for performing a configuration relating to an SRB. The DRB-ToAddMod information element includes one RLC-Config information element, and the SRB-ToAddMod information element includes one RLC-Config information element.

A parameter for each activation mode of an RLC entity is set in the conventional RLC-Config information element illustrated in FIG. 10. Here, three activation modes of an Acknowledge Mode (AM), an Unacknowledge Mode (UM), and a Transparent Mode (TM) are in the RLC entity. Since the AM has highest reliability, the AM is generally easily applied to TCP traffic and the like. Since the UM does not have reliability of an extent of the AM, but has small delay, the UM is generally easily applied to Voip traffic and the like, but it is not necessarily limited thereto. In the RLC-Config information element, a configuration relating to the AM and the UM is performed other than the TM which passes RLC itself. As described above, since an uplink RLC entity and a downlink RLC entity are individually provided, ul-AM-RLC for configuring an uplink AM, dl-AM-RLC for configuring a downlink AM, ul-UM-RLC for configuring an uplink UM, and dl-UM-RLC for configuring a downlink UM are respectively prepared. Regarding the UM, there are a case of a bi-direction and a case of a uni-direction. Details of each of the information elements included in the RLC-Config information element will be omitted.

FIG. 11 illustrates (excerpts) an example of the RRCConnectionReconfiguration message in a radio communication system according to this embodiment. FIGS. 12 and 13 illustrate (respectively excerpt) an example of the RadioResourceConfigDedicated information element and the RLC-Config information element in the radio communication system according to this embodiment. In FIGS. 11 to 13, an underline is attached to each location which is substantially added to a conventional message or a conventional information element. "-r12" which is a suffix indicating that a parameter or an information element is defined in Release 12 is attached to each of names of the parameter or the information element. This attachment of the suffix is based on a custom.

In the RRCConnectionReconfiguration message according to this embodiment illustrated in FIG. 11, RRCConnectionReconfiguration-r1130-IEs described above further includes RRCConnectionReconfiguration-r1200-IEs which is an information element including a parameter group defined in Release 12 of 3GPP, for example. RRCConnectionReconfiguration-r1200-IEs includes an SPCellToAddModList-r12 information component as illustrated in FIG. 11. SPCellToAddModList-r12 information component includes one SPCellToAddMod-r12 information element or more. A SPCell is abbreviation of a SecondaryPrimaryCell, and names of the parameters or the information elements illustrated in FIGS. 11 to 13 are used as one example.

Here, the SPCellToAddMod-r12 information element includes information which is an information element for adding an additional RLC entity (secondary RLC entity) or for changing a configuration, and relates to the radio base station 10 for activating the additional RLC entity. The SPCellToAddMod-r12 information element includes PhysCellID-r12 which is identification information indicating the radio base station 10 for activating the additional RLC entity. In the RRCConnectionReconfiguration message in S206 of FIG. 6, the identification information indicating the second radio base station 10b is set in a PhysCell ID.

As illustrated in FIG. 11, the SPCellToAddMod-r12 information element can include a dl-CarrierFreq-r12 information element which is information indicating a downlink frequency of a frequency band used by the radio base station 10 which activates the additional RLC entity. The SPCellToAddMod-r12 information element can include radioResourceConfigCommonSPCell-r12 for performing a common configuration of radio resources in the radio base station 10 which activates the additional RLC entity, or radioResourceConfigDedicatedSPCell-r12 for performing an individual configuration of the radio resources in the radio base station 10 which activates the additional RLC entity. Information included in the SPCellToAddMod-r12 information element can be obtained in accordance with information included in an SCellToAddMod-r10 information element which is an information element in which information regarding a secondary cell (SCell) in carrier aggregation in the conventional LTE system is stored. Thus, detailed descriptions will be omitted herein.

Next, FIG. 12 illustrates an example of the radioResourceConfigDedicatedSPCell-r12 information element (described above) which is one of information elements included in the SPCellToAddMod-r12 information element. Information included in the radioResourceConfigDedicatedSPCell-r12 information element can be obtained roughly in accordance with the radioResourceConfigDedicated information element (FIG. 9) in the conventional LTE system. Thus, detailed descriptions will be omitted herein. However, an RLC-Config-r12 information element included in the radioResourceConfigDedicatedSPCell-r12 information element in this embodiment is substantially different from RLC-Config (FIG. 10) included in the radioResourceConfigDedicated information element (FIG. 9) in the conventional LTE system, and thus descriptions thereof will be made herein.

FIG. 13 illustrates an example of the RLC-Config-r12 information element in this embodiment (underlines are attached to substantial differences from FIG. 10). ul-AM-RLC-r12, dl-AM-RLC-r12, ul-UM-RLC-r12, and dl-UM-RLC-r12 which are used for configuring a primary RLC entity can be added to the RLC-Config-r12 information element illustrated in FIG. 13, and ul-AM-sRLC-r12, dl-AM-sRLC-r12, ul-UM-sRLC-r12, and dl-UM-sRLC-r12 which are used for configuring a secondary RLC entity can be configured. "-r12" which is a suffix based on a custom is attached to these parameters, as described above. However, parameters to which this suffix is not attached can be handled equally, and thus detailed descriptions thereof will be omitted.

Returning to the descriptions of FIG. 6, the first radio base station 10a notifies the second radio base station 10b which is a radio base station 10 for activating the additional RLC entity (secondary RLC entity) of information regarding the entity in S207. At this time, the first radio base station 10a may notify the second radio base station 10b of information regarding the radio terminal 20. Thus, the second radio base station 10b can recognize that the second radio base station 10b is selected as a radio base station 10 for activating the additional RLC entity. Although not illustrated in FIG. 6, the second radio base station 10b may transmit a response signal (ACK) to the notification in S207, to the first radio base station 10a. A signal in S207 and the response signal to the signal in S207 can be realized by using an X2AP message which is a message in an X2 interface being an interface between radio base stations 10.

As described above, after S203 in which the radio terminal 20 performs transition to the RRC_CONNECTED state, the radio terminal 20 regularly transmits a measurement report as in S206 to the first radio base station 10a. The first radio base station 10a notifies the radio terminal 20, the second radio base station 10b, and a third radio base station 10 of intent of a change when changing of the radio base station 10 for activating the additional RLC entity has to be performed, such as a case where a small radio base station 10 which has the maximum reception power in the received measurement report is a radio base station 10 (set as the third radio base station 10) different from the second radio base station 10b. This process can be performed similarly to the processes of S206 to S207.

As described above, the radio terminal 20 performs transition to the RRC_CONNECTED state, and thus the radio terminal 20 can perform transmission and reception of user data between the radio terminal 20 and the first radio base station 10a through the U-Plane. For example, the first radio base station 10a transmits downlink user data to the radio terminal 20 in S208 of FIG. 6. The radio terminal 20 can also transmit uplink user data to the first radio base station 10a.

The first radio base station 10a regularly determines whether or not to activate the additional RLC entity (secondary RLC entity). This determination can be performed as follows, for example.

First, the first radio base station 10a receives information regarding a load from a small cell which is a subordinate, and the received information is used as a determination basis for performing the above-described determination. In FIG. 6, for example, the first radio base station 10a receives the information regarding the load from the second radio base station 10b which is one of subordinate small cells, in S209. The information regarding the load may be information based on a computer resource such as utilization of a processor and utilization of a memory, and may be information based on a radio resource such as the number of connected radio terminals 20 and a radio resource usage, to the second radio base station 10b. Although not illustrated in FIG. 6, first radio base station 10a may also transmit a response signal (ACK) to the notification in S209. A signal in S209 and the response signal to the signal in S209 can be realized by using the above-described X2AP message.

At this time, the first radio base station 10a acquires load information of the first radio base station 10a and can regularly determine whether or not to activate the additional RLC entity (secondary RLC entity) based on the acquired load information and load information of the other radio base station 10, which is received from the radio base station 10. In FIG. 6, for example, the first radio base station 10a determines whether or not to activate additional RLC entity in S210. For example, the first radio base station 10a can determine the additional RLC entity to be activated when a difference between a load of the first radio base station 10a and a load of the other station is equal to or greater than a predetermined value in this determination. In the example of FIG. 6, in S211, the first radio base station 10a determines the additional RLC entity to be activated based on determination (load increase) in that a difference between the load of the first radio base station 10a and a load of the second radio base station 10b is equal to or greater than a predetermined value.

According to the above descriptions, the first radio base station 10a determines the radio terminal 20 to activate the additional RLC entity (secondary RLC entity) in S210. However, determination in S210 may be determination of causing the second radio base station 10b to activate the secondary RLC entity. The determination in S210 may be determination of causing both of the radio terminal 20 and the second radio base station 10b to activate the secondary RLC entity.

In S211 of FIG. 6, the first radio base station 10a transmits an L2 signal for activating the additional RLC entity (secondary RLC entity) to the radio terminal 20. In this embodiment, an RLC control PDU which is a control packet of the RLC layer is used as the L2 signal in S211.

Figure 14:
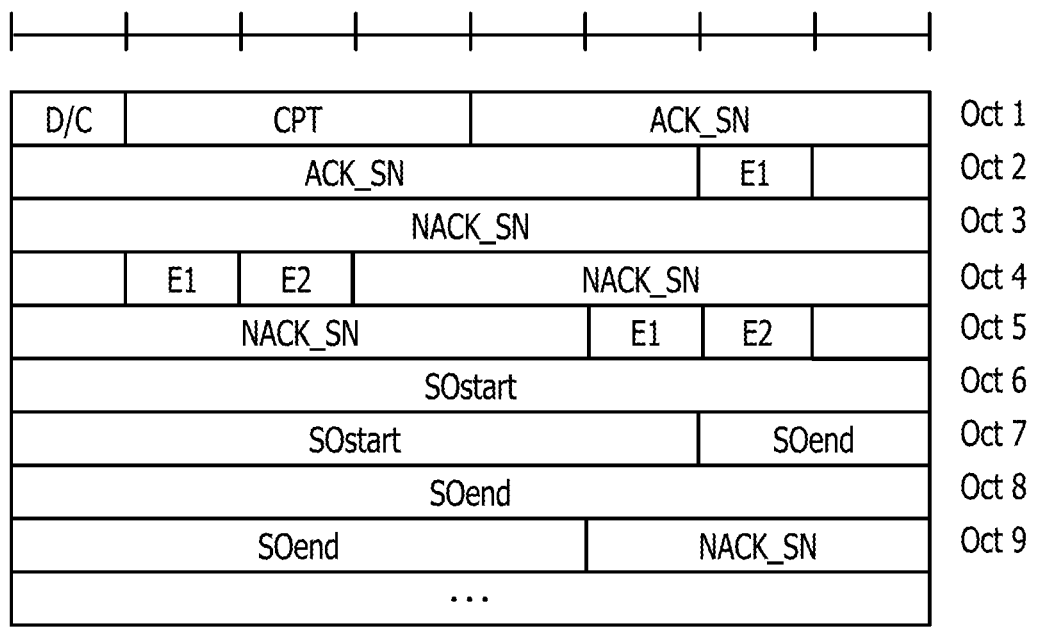
FIG. 14 is a diagram illustrating an RLC control PDU in the LTE system.

Here, for comparison, FIG. 14 illustrates the RLC control PDU in the conventional LTE system. A focused part in the RLC control PDU illustrated in FIG. 14 is a field referred to as a Control PDU Type (CPT). The CPT is 3-bit information indicating the type of the RLC control PDU. Here, it is importance that the CPT is reserved when the CPT has a value other than "000". Regions other than the CPT have little relationship with this application, and thus descriptions thereof will be omitted.

FIGS. 15A to 15D illustrate RLC control PDUs used in this embodiment. In an RLC control PDU illustrated in FIG. 15A, the value of the CPT is set to any one (for example, "001") of a reserved bit string. Thus, the type of the RLC control PDU can be newly set so as to be proper for the purpose of this application. In other words, even when a format of the RLC control PDU is newly set so as to be proper for the purpose of this application, compatibility with specifications can be ensured.

Figure 15A:
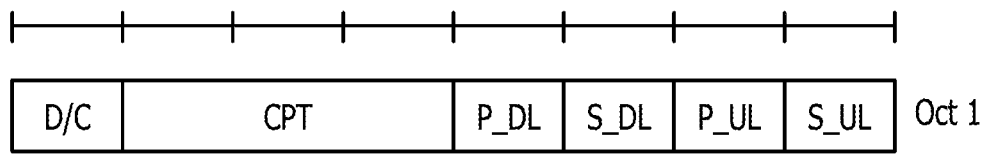
FIGS. 15A, 15B, 15C and 15D are diagrams illustrating examples of RLC control PDUs in the second embodiment.

The RLC control PDU illustrated in FIG. 15A includes four parameters of P_DL, S_DL, P_UL, and S_UL. Each of these parameters has one bit. Activation of the RLC entity is designated as 1 and deactivation of the RLC entity is designated as 0. More specifically, P_DL is used for designating activation or deactivation of a downlink primary RLC entity. S_DL is used for designating activation or deactivation of a downlink secondary RLC entity. P_UL is used for designating activation or deactivation of an uplink primary RLC entity. S_UL is used for designating activation or deactivation of an uplink secondary RLC entity.

In S211 of FIG. 6, the first radio base station 10a transmits an RLC control PDU for causing the second radio base station 10b to activate an additional entity, to the radio terminal 20 based on the determination of S210. At this time, in the RLC control PDU illustrated in FIG. 15A, the value of the CPT can be set to "001", a value of P_DL can be set to 1 (activation), a value of S_DL can be set to 1 (activation), a value of P_UL can be set to 1 (activation), and a value of S_UL can be set to 1 (activation). This setting corresponds to holding of the RLC entity activated in the first station and causing the second radio base station 10b to activate the additional entity. In other words, this setting corresponds to the radio terminal 20 performing dual connectivity with the first radio base station 10a and the second radio base station 10b.

For example, in the RLC control PDU illustrated in FIG. 15A, the value of the CPT can be set to "001", a value of P_DL can be set to 1 (activation), a value of S_DL can be set to 0 (deactivation), a value of P_UL can be set to 1 (activation), and a value of S_UL can be set to 1 (activation). In this case, the radio terminal 20 realizes the dual connectivity with the first radio base station 10a and the second radio base station 10b in only an uplink. Thus, an effect of improving characteristics of uplink transmission, and the like is obtained.

In FIG. 15A, regarding each of the primary RLC entity and the secondary RLC entity, activation or deactivation in an uplink and a downlink is individually set. However, activation or deactivation in the uplink and the downlink can be collectively set.

Figure 15B:
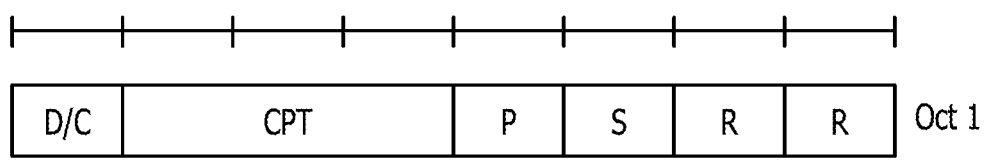

FIG. 15B illustrates another example of the RLC control PDU in this embodiment. In the RLC control PDU illustrated in FIG. 15B, P is used for designating activation or deactivation of the primary RLC entity (uplink and downlink). S is used for designating activation or deactivation of the secondary RLC entity (uplink and downlink). As described above, configurations of the uplink and the downlink in each of the RLC entities are individually performed by using an uplink RLC-Config-r12 information element (FIG. 13) and a downlink RLC-Config-r12 information element in this embodiment. Accordingly, it is considered that failure in designation of activation or deactivation by the RLC control PDU does not occur particularly even when the uplink and the downlink are integrated.

Activation or deactivation only for the secondary RLC entity can be designated without designation of activation or deactivation for the primary RLC entity.

Figure 15C:
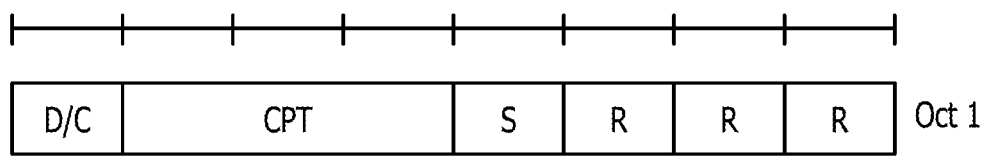

FIG. 15C illustrates the other example of the RLC control PDU in this embodiment. In the RLC control PDU illustrated in FIG. 15C, S is used for designating activation or deactivation of the secondary RLC entity (uplink and downlink). In the RLC control PDU illustrated in FIG. 15C, activation or deactivation for the primary RLC entity is not designated. The primary RLC entity has a premise of being normally activated, and thus it is considered that the RLC control PDU illustrated in FIG. 15C is desired and sufficient in such a case.

For example, when all of the values of P_DL, S_DL, P_UL, and S_UL are set to 1 in the RLC control PDU illustrated in FIG. 15A, as described above, the radio terminal 20 realizes the dual connectivity with the first radio base station 10a and the second radio base station 10b. At this time, the dual connectivity can be used properly in a higher layer in any form. As a first example, the C-Plane (SRB) can be dealt with by the primary RLC entity which is activated by the first radio base station 10a, and the U-Plane (DRB) can be dealt with by the secondary RLC entity which is activated by the second radio base station 10b. Thus, it is possible to realize off-load of user data and to reduce the load of the first radio base station 10a. As a second example, firstly, either of the C-Plane and the U-Plane can be dealt with by the secondary RLC entity which is activated by the second radio base station 10b, and the C-Plane and the U-Plane can be dealt with by the primary RLC entity which is activated by the first radio base station 10a, at a time of fallback. Thus, it is possible to cause the L3 signal (RRC signal) added to the user data to be also subjected to off-load, and to avoid instantaneous interruption at the time of fallback. As a third example, the C-Plane can be dealt with by the primary RLC entity which is activated by the first radio base station 10a, and the U-Plane can be dealt with by using both of the primary RLC entity and the secondary RLC entity which is activated by the second radio base station 10b. Thus, it is possible to improve throughput of user data. In other various forms, the dual connectivity can be used properly.

Figure 15D:
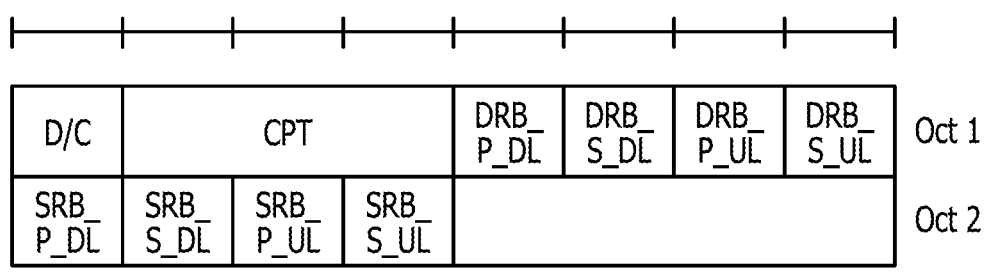

Here, information indicating the above three examples or other forms can be included in the RLC control PDU in S211 of FIG. 6. FIG. 15D illustrates an example of such an RLC control PDU. The RLC control PDU illustrated in FIG. 15B includes eight parameters of DRB_P_DL, DRB_S_DL, DRB_P_UL, DRB_S_UL, SRB_P_DL, SRB_S_DL, SRB_P_UL, and SRB_S_UL. For example, DRB_S_DL is used for designating activation or deactivation of a downlink secondary RLC entity in the DRB (U-Plane). Other seven parameters are similarly used. With this, for example, values of the four parameters of DRB_S_DL, DRB_S_UL, SRB_P_DL, and SRB_P_UL are respectively set to 1 (activation), and values of the four parameters of DRB_P_DL, DRB_P_UL, SRB_S_DL, and SRB_S_UL are respectively set to 0 (deactivation). Thus, a form of the dual connectivity described in the above first example can be shown. As described above, regarding the DRB and the SRB in the RRCConnectionReconfiguration message of S206, the RLC-Config information element is individually configured (FIG. 13). Accordingly, it is considered that a particular problem does not occur even when the DRB and the SRB in the RLC control PDU of S211 are individually configured, as in FIG. 15B.

Returning to the descriptions of FIG. 6, the first radio base station 10a activates the additional RLC entity (secondary RLC entity) in S211. Thus, the first radio base station 10a transmits the RLC control PDU illustrated in FIGS. 15A to 15D to the radio terminal 20. Then, the first radio base station 10a notifies the second radio base station 10b of activation of the additional RLC entity in S212. Although not illustrated in FIG. 6, the second radio base station 10b may transmit a response signal (ACK) to the notification of S212 to the first radio base station 10a. A signal in S212 and the response signal to the signal in S212 can be realized by using the above-described X2AP message.

The radio terminal 20 performs random access between the radio terminal 20 and the second radio base station 10b in S213. At this time, the radio terminal 20 can perform the random access in a state where downlink synchronization with the second radio base station 10b is obtained, by using information (dl-CarrierFreq-r12 information element in FIG. 11) which indicates a downlink radio frequency of the second radio base station 10b and is included in the RRCConnection-Reconfiguration message in S206. The radio terminal 20 establishes uplink synchronization with the second radio base station 10b by performing the random access in S213. The U-Plane and the C-Plane are established between the radio terminal 20 and the second radio base station 10b, and the dual connectivity for the radio terminal 20 is realized. Thus, the radio terminal 20 can perform transmission and reception of user data between the radio terminal 20 and the second radio base station 10b through the U-Plane, for example. As described above, basically, the dual connectivity can be used properly in a higher layer in any form. However, when the RLC control PDU illustrated in FIG. 15D is used in S211, the radio terminal 20 performs properly the dual connectivity in accordance with a form indicated by the RLC control PDU.

In the example illustrated in FIG. 6, as an example, the dual connectivity is used in a form in which the C-Plane (SRB) is dealt with by the primary RLC entity which is activated by the first radio base station 10a and the U-Plane (DRB) is dealt with by the secondary RLC entity which is activated by the second radio base station 10b. In this case, in processes subsequent to S213, when the first radio base station 10a transmits downlink user data to the radio terminal 20, it is desired that the user data is transferred to the second radio base station 10b first. The second radio base station 10b performs radio transmission of the transferred user data to the radio terminal 20.

A transferring method of data to the second radio base station 10b from the first radio base station 10a will be described. GTP-U (GPRS (General Packet Radio Service) Tunnelling Protocol User) is used in transferring of data between radio base stations 10. However, two types of methods are considered for GTP-U. In a first method, transferring is performed by using an RLC PDU which is a protocol data unit of the RLC layer. In the first method, SN of GTP is stored in a header portion of the GTP, an RLC service data unit (SDU) which is a service data unit of the RLC layer is stored in a payload portion, and the stored SN and SDU are transferred. In this sense, transferring may be performed by using the RLC SDU. The RLC SDU is a PDCP PDU which is a protocol data unit of the PDCP layer which is a higher layer of the RLC layer. A sequence number (SN) of the PDCP layer is added to a PDCP SDU which is a service data unit of the PDCP layer. In a second method, transferring is performed by using the PDCP PDU. In the second method, the sequence number of the PDCP is stored in an extended header portion of the GTP, the PDCP SDU which is a service data unit of the RLC layer is stored in the payload portion, and the stored sequence number of the PDCP and PDCP SDU are transferred. In this sense, transferring may be performed by using the PDCP SDU.

In the example of FIG. 6, the first radio base station 10a transfers downlink user data to the second radio base station 10b in S214. The second radio base station 10b performs radio transmission of the downlink user data to the radio terminal 20 in S215. For example, the first radio base station 10a performs radio transmission of the RRC signal (L3 signal) to the radio terminal 20 in S216. As described above, in the example of FIG. 6, since the C-Plane (SRB) is dealt with by the primary RLC entity which is activated by the first radio base station 10a, the RRC signal is transmitted to the radio terminal 20 by the first radio base station 10a (without passing through the second radio base station 10b).

As described above, the first radio base station 10a regularly determines whether or not to activate the additional RLC entity (secondary RLC entity). Specifically, the first radio base station 10*a* acquires load information of the first radio base station 10*a*, and regularly determines whether or not to activate the additional RLC entity based on the acquired load information and load information (S217) of the other radio base station 10, which is received from the radio base station 10. Here, in FIG. 6, the first radio base station 10*a* determines deactivation of the additional RLC entity by a difference between a load of the first radio base station 10*a* and a load of the second radio base station 10*b* being less than a predetermined value (load decrease), in S218.

At this time, the first radio base station 10*a* transmits an L2 signal for deactivating the additional RLC entity to the radio terminal 20 in S219. In this embodiment, as the L2 signal in S219, the RLC control PDU which is described above as illustrated in FIGS. 15A to 15D can be used. As an example, when the RLC control PDU illustrated in FIG. 15A is used, the value of the CPT can be set to "001", the value of P_DL can be set to 1 (activation), the value of S_DL can be set to 0 (deactivation), the value of P_UL can be set to 1 (activation), and the value of S_UL can be set to 0 (deactivation). This setting corresponds to holding of the RLC entity activated in the first station and causing the second radio base station 10*b* to deactivate the additional entity. In other words, the radio terminal 20 releases dual connectivity, and performs transition to single connection with only the first radio base station 10*a*.

Then, the first radio base station 10*a* notifies the second radio base station 10*b* of deactivating of the RLC entity in S220. Although not illustrated in FIG. 6, the second radio base station 10*b* may transmit a response signal (ACK) to the notification in S220 to the first radio base station 10*a*. A signal in S220 and the response signal to the signal in S220 can be realized by using the above-described X2AP message.

Since the radio terminal 20 performs transition to the single connection, after that, the radio terminal 20 receives the user data in addition to only the L3 signal (RRC signal) from the first radio base station 10*a* by using a radio signal (without passing through the second radio base station 10*b*). In FIG. 6, for example, the first radio base station 10*a* transmits downlink user data to the radio terminal 20 in S221.

The processing sequences in the second embodiment illustrated in FIG. 6 become a method in which the L2 control signal (specifically, RLC control PDU) and the L3 control signal (specifically, RRC signal) are properly used and thus mutual insufficiency can be complemented and advantages can be shared, similarly to that in the first embodiment. Works and effects obtained in the second embodiment are similar to those in the first embodiment, and thus descriptions thereof will be omitted.

As described above, according to the second embodiment, similarly to that in the first embodiment, either of the delay problem due to the L3 control signal (RRC signal) and the problem of expansibility due to the L2 control signal (RLC control PDU) can be solved and dividing of data in the data link layer (RLC layer), which is starting of the dual connectivity can be realized. Accordingly, according to the second embodiment, it is possible to realize switching of the dual connectivity (division of data in the data link layer) having both of a high speed and compatibility.

Regarding the RRCConnectionReconfiguration message (S206 and the like in FIG. 6) according to Embodiment 2, the RRCConnectionReconfiguration message illustrated in FIG. 11 is just one example. Here, another example will be described simply.

FIG. 16 illustrates another example of the RRCConnectionReconfiguration message according to the second embodiment. In FIG. 16, an RRCConnectionReconfiguration-v1200-IEs information element includes a secondaryConnectivityControlInfo-r12 information element instead of the SPCellToAddMod-r12 information element in FIG. 11.

FIG. 17 illustrates an example of the secondaryConnectivityControlInfo-r12 information element. As illustrated in FIG. 17, the secondaryConnectivityControlInfo-r12 information element includes the same type of information as information included in the above-described SPCellToAddMod-r12 information element. For example, the secondaryConnectivityControlInfo-r12 information element includes secondaryPhysCellID-r12 which is an identification information indicating a radio base station 10 for activating the additional RLC entity (secondary RLC entity). The secondaryConnectivityControlInfo-r12 information element can include information (carrierFrweq-r12, carrierBandwidth-r12) indicating a frequency band used by a radio base station 10 for activating the additional RLC entity. The SPCellToAddMod-r12 information element can include radioResourceConfigCommon-SPCell-r12 for performing a common configuration of radio resources in the radio base station 10 which activates the additional RLC entity, or radioResourceConfigDedicated-SPCell-r12 (FIG. 12) for performing an individual configuration of the radio resources in the radio base station 10 which activates the additional RLC entity. Information included in the SPCellToAddMod-r12 information element can be obtained in accordance with information included in a MobilityControlInfo information element which is an information element in which information regarding a handover destination radio base station 10 in carrier aggregation in the conventional LTE system is stored. Thus, detailed descriptions will be omitted herein.

As the last of the second embodiment, various types of control processing subsidiary to the second embodiment will be described below. These types of control processing are not desired for the second embodiment, but can be used for further using the second embodiment. Thus, it is considered that realizing of these types of control processing is desired as possible. It is noted that these types of control processing can be also similarly applied to other embodiment in this application, but descriptions thereof will be omitted in the other embodiments.

Firstly, in the second embodiment, the first radio base station 10*a* regularly determines whether or not to activate the additional RLC entity (secondary RLC entity). Here, in the descriptions relating to the processes of S210, S218, or the like in FIG. 6, this determination is performed based on the load of the first radio base station 10*a*, but can be performed based on other determination bases.

Specifically, for example, when improvement of characteristics in radio communication is expected, the first radio base station 10*a* can determine activation of the additional RLC entity. As described above, the first radio base station 10*a* regularly receives a measurement report from the radio terminal 20 and the received measurement report can include reception quality from the second radio base station 10*b*. As the reception quality, for example, RSRP (Reference Signal Received Power), RSRQ (Reference Signal Received Quality), RSSI (Received Signal Strength Indicator), and the like are included. Thus, the first radio base station 10*a* can activate the additional RLC entity, for example, when the reception quality in the radio terminal 20 from the second radio base station 10*b* is better than that from the first radio base station 10*a*. Here, it is also considered that general handover is performed when the reception quality in the radio terminal 20 from the second radio base station 10*b* is better than that from the first radio base station 10*a*. However, as described above, handover processing has a problem that there is long delay or a problem that handover has to be performed again when quality of service is changed after handover is performed once. As described above, it is considered that when the reception quality in the radio terminal 20 from the second radio base station 10b is better than that from the first radio base station 10a, activation of the additional RLC entity has large significance in that a problem of handover can be avoided and switching to a radio base station 10 having better reception quality (improvement of characteristics in radio communication is expected) can be performed.

Secondly, handover processing at a time of performing the dual connectivity will be described. For example, when the radio terminal 20 realizes dual connectivity in which the radio terminal 20 is connected with the first radio base station 10a by the primary RLC entity and is connected with the second radio base station 10b by the secondary RLC entity, quality of service between the radio terminal 20 and the first radio base station 10a can be deteriorated. In this case, first, it is desired that the first radio base station 10a transmits the RLC control PDU for causing the radio terminal 20 to deactivate the secondary RLC entity and performs the handover processing for the radio terminal 20. This is because the secondary RLC entity is continuously activated by the radio terminal 20, if the handover processing is performed simply. It is considered that the secondary RLC entity is deactivated by timer control (instead of reception of the RLC control PDU). However, since the secondary RLC entity is continuously activated until a timer is run out, it is considered that an overt instruction of deactivation using the RLC control PDU is desired. As specific timer control, for example, a method in which if the RLC control PDU for causing the radio terminal 20 to activate the RLC entity is received, a timer (deactivation timer) is started and if a value of the timer reaches a preset value (period of time), the timer is run out is included. The value of the timer can be set in S204 or S206, for example. As a layer having the timer, the RLC layer is optimal, but other layers can be applied. Since it is preferable that suspension of activation is performed with synchronization of the radio base station 10 with the radio terminal 20, a timer also counts similarly in the radio base station 10.

Thirdly, processing when transmission and reception of the RLC control PDU for activating or deactivating the additional RLC entity (secondary RLC entity) fails. First, a case where transmission and reception (for example, S211 in FIG. 6) of the RLC control PDU for activating or deactivating the secondary RLC entity fails will be described. In this case, it is considered that quality of service between the first radio base station 10a and the radio terminal 20 (primary RLC entity) is deteriorated, and thus performing of handover (RRC Connection Re-establishment including Mobility ControlInfo) is desired. In addition, before the handover, RRC connection re-establishment (RRC Connection Re-establishment not including Mobility ControlInfo) can be performed, and thus connection re-establishment with the radio base station 10 can be attempted rapidly. Here, any radio base station 10 can be applied as long as the "radio base station 10" is a radio base station 10 which holds context (information which can specify the radio terminal 20, such as identification information of the radio terminal 20, and security information) of the radio terminal 20. Detailed descriptions thereof are the same as procedures of the conventional LTE system, and thus will be omitted.

A case where transmission and reception of the RLC control PDU (for example, S219 in FIG. 6) for deactivating the secondary RLC entity fails will be described. In this case, it is considered that quality of service between the first radio base station 10a and the radio terminal 20 (primary RLC entity) is deteriorated when there is a configuration in which the radio terminal 20 transmits a response signal (ACK signal or NACK signal) to reception of a downlink data signal (including an RLC control PDU) to the first radio base station 10a. Thus, performing of the handover is desired. RRC connection re-establishment as described above may be performed. On the contrary, when there is a configuration in which the radio terminal 20 transmits the response signal to the second radio base station 10b, determination of whether the quality of service between the first radio base station 10a and the radio terminal 20 is deteriorated or quality of service between the second radio base station 10b and the radio terminal 20 is deteriorated is impossible. In this case, the radio terminal 20 deactivates the secondary RLC entity by the timer control (instead of reception of the RLC control PDU). Since the timer is shared between the radio terminal 20 and the first radio base station 10a, the first radio base station 10a at this time suspends transmission and reception for the radio terminal 20 until the timer is run out. Thus, transition to single connection between the radio terminal 20 and the first radio base station 10a is performed. Accordingly, when the quality of service between the second radio base station 10b and the radio terminal 20 has been deteriorated, inconvenience is resolved. Then, when deterioration of quality of service between the first radio base station 10a and the radio terminal 20 is detected, the first radio base station 10a performs the handover processing for the radio terminal 20. Thus, even when quality of service between the first radio base station 10a and the radio terminal 20 has been deteriorated, inconvenience is resolved.

When there is the configuration in which the radio terminal 20 transmits a response signal (ACK signal or NACK signal) to reception of the downlink data signal (including an RLC control PDU) to the second radio base station 10b, the response signal may be transmitted to the first radio base station 10a in limitation to a case where the downlink data signal is an RLC control PDU for deactivating the secondary RLC entity. A reason of failure in transmission and reception of the RLC control PDU is limited to deterioration of quality of service between the first radio base station 10a and the radio terminal 20 by transmitting the response signal in this manner. Accordingly, when transmission and reception of the RLC control PDU fails, the first radio base station 10a can cause the radio terminal 20 to be immediately subjected to handover. Additionally, RRC connection re-establishment as described above may be performed. This method is considered to be more excellent than the aforementioned method in that the first radio base station 10a performs handover without waiting for running out of the timer.

Fourthly, processing when quality of service between the additional RLC entity (secondary RLC entity) of the radio terminal 20 and the second radio base station 10b is deteriorated will be described. For example, a case where interference and the like from the first radio base station 10a causes quality of service in the secondary RLC entity to be deteriorated is considered. Deterioration of quality of service in the secondary RLC entity can be detected by using RSRP, RSRQ, RSSI, and the like which are described above. In such a case, the first radio base station 10a can transmit an RLC control PDU for deactivating the secondary RLC entity (for example, S219 in FIG. 6). Thus, the secondary RLC entity is deactivated and the problem is solved.

Fifthly, processing when link connection between the additional RLC entity (secondary RLC entity) of the radio terminal 20 and the second radio base station 10b fails will be described. For example, failure in link connection of the secondary RLC entity can be detected by the number of re-transmission of data reaching the maximum, and the like. At this time, it is considered that the secondary RLC entity in the radio terminal 20 is deactivated by the above-described timer control (instead of reception of the RLC control PDU) in many cases. The RLC control PDU for causing the first radio base station 10*a* to deactivate the secondary RLC entity may be transmitted (for example, S219 in FIG. 6). Thus, the secondary RLC entity is deactivated and the problem is solved.

According to the second embodiment described above, it is possible to obtain effects similar to those in the first embodiment. That is, according to the second embodiment, at least either of the delay problem due to the L3 control signal (RRC signal) and the problem of expansibility due to the L2 control signal (RLC control PDU) can be solved and dividing of data in the data link layer (RLC layer), which is starting of the dual connectivity can be realized. Accordingly, in the second embodiment, a new effect is obtained in which switching of the dual connectivity (division of data in the data link layer) having both of a high speed and compatibility can be realized, which is not obtained in the conventional technology.

Third Embodiment

A third embodiment is obtained by applying the first embodiment to the LTE system. Specifically, the L2 entity (processing entity) in the first embodiment is changed to a PDCP entity, the first control signal is changed to an RRC signal, and the second control signal is changed to a PDCP control packet. That is, in the third embodiment, a plurality of PDCP entities is activated and thus data is divided in the PDCP layer so as to realize the dual connectivity and the like.

The third embodiment is obtained by applying the first embodiment to the LTE system, similarly to the second embodiment. Accordingly, processing in the third embodiment has many common points with the processing in the second embodiment. Thus, descriptions will be made below focused on differences between the third embodiment and the second embodiment.

Figure 18:
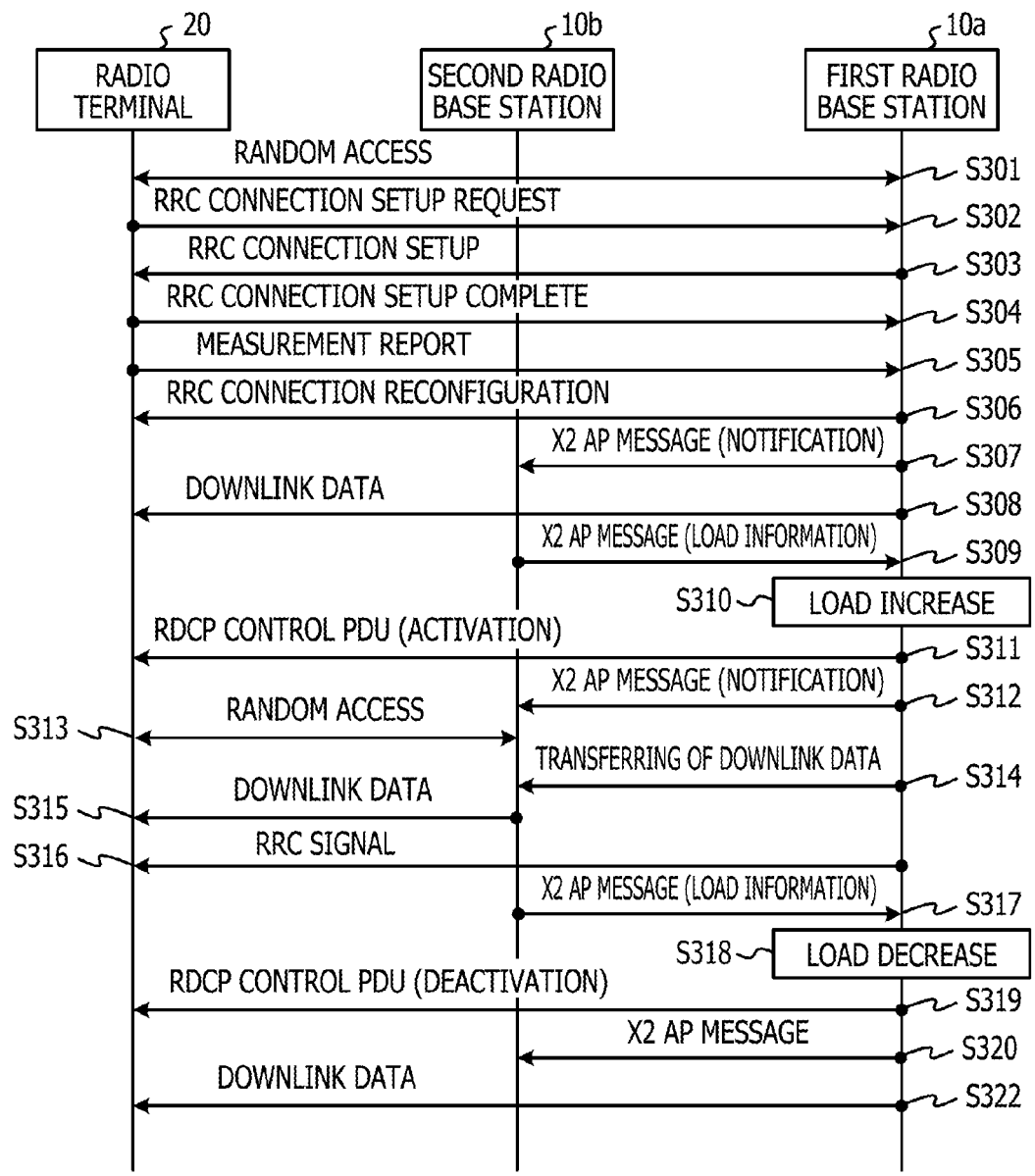
FIG. 18 is a diagram illustrating an example of processing sequences of a radio communication system according to a third embodiment.

FIG. 18 illustrates an example of processing sequences according to the third embodiment. Similarly to those in the first and the second embodiments, there are also a radio terminal 20, a first radio base station 10*a*, and a second radio base station 10*b* in the third embodiment. As a typical example, a case where the first radio base station 10*a* is a macro radio base station 10 and the second radio base station 10*b* is a small radio base station 10 is considered. However, the first radio base station 10*a* can be the small radio base station 10, and the second radio base station 10*b* can be the macro radio base station 10.

Figure 19:
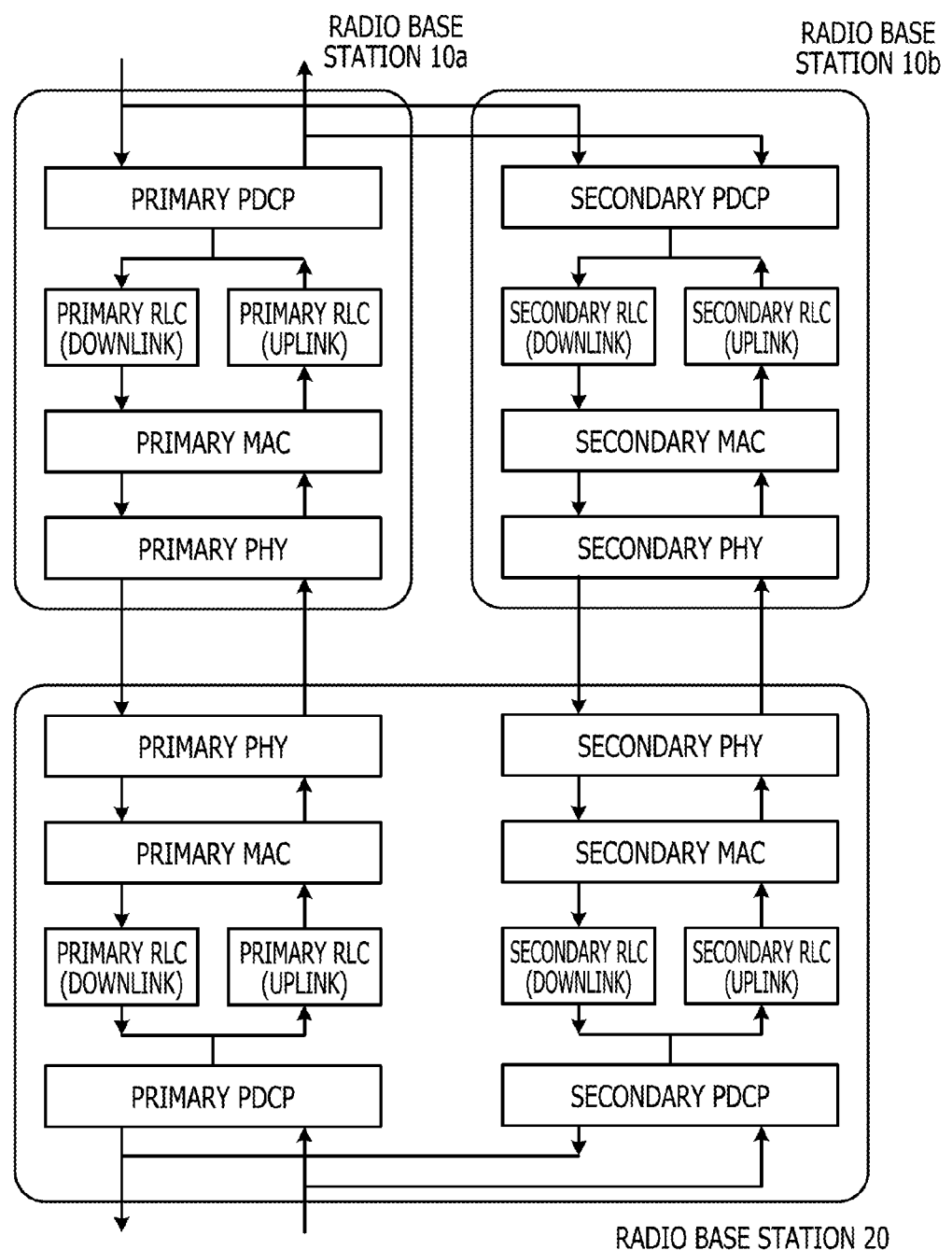
FIG. 19 is a diagram illustrating a protocol stack of data communication in the radio communication system according to the third embodiment.

A protocol stack of the third embodiment, which is different from that in the second embodiment will be described. FIG. 19 illustrates an example of a protocol stack of an U-Plane according to the third embodiment. As described in the beginning, in the third embodiment, a plurality of PDCP entities is activated, and thus data is divided in the PDCP layer so as to realize the dual connectivity and the like. FIG. 19 illustrates entities activated by the first radio base station 10*a* (for example, macro radio base station 10) and the second radio base station 10*b* (for example, small radio base station 10). A PDCP entity, an RLC entity, a MAC entity, and a physical entity are activated by each of the first radio base station 10*a* and the second radio base station 10*b*. In this manner, data can be divided in the PDCP layer so as to realize the dual connectivity and the like by activating a plurality of PDCP entities.

Accordingly, in the second embodiment described above, a plurality of RLC entities is activated and thus data is divided in the RLC layer so as to realize the dual connectivity and the like. However, in the third embodiment, a plurality of PDCP entities is activated and thus data is divided in the PDCP layer so as to realize the dual connectivity and the like. In other words, the third embodiment is different from the second embodiment in the class (layer) of the processing for performing the dual connectivity and the like.

Next, the processing sequences in the third embodiment, which are illustrated in FIG. 18 will be described. The processing sequences in the third embodiment are almost the same as the processing sequences in the second embodiment illustrated in FIG. 6. Descriptions of the processing sequence in the third embodiment, which are illustrated in FIG. 18 can be obtained by substituting "RLC" with "PDCP" in the descriptions of the processing sequences (illustrated in FIG. 6) in the second embodiment and reading a result of substitution. Accordingly, detailed descriptions of the processing sequences illustrated in FIG. 18 will be omitted herein.

A difference between S311 in FIG. 18 and S211 in FIG. 6 will be described herein. In S311 in FIG. 18 and S211 in FIG. 6, the first radio base station 10*a* transmits an L2 signal for activating an additional L2 entity (secondary L2 entity) to the radio terminal 20. However, in S211 of FIG. 6, the transmitted L2 signal is an RLC control PDU, but in S311 of FIG. 18, the transmitted L2 signal is a PDCP Control PDU. That is, in the third embodiment, the first radio base station 10*a* transmits a PDCP Control PDU for activating an additional PDCP entity (secondary PDCP entity) to the radio terminal 20 in S311 of FIG. 18.

The PDCP Control PDU has a format largely different from the RLC control PDU illustrated in FIGS. 15A to 15D, and thus descriptions thereof will be made below.

Figure 20A:
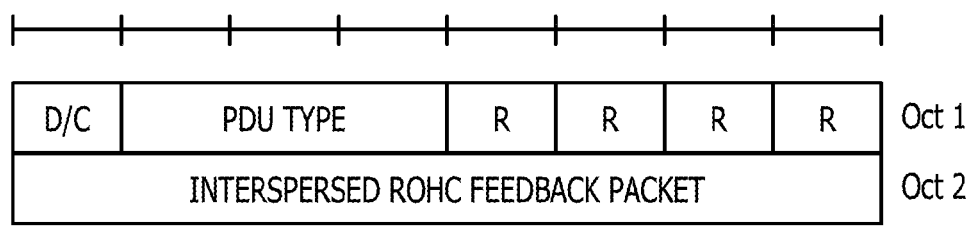
FIGS. 20A and 20B are diagrams illustrating PDCP control PDUs in the LTE system.
Figure 20B:
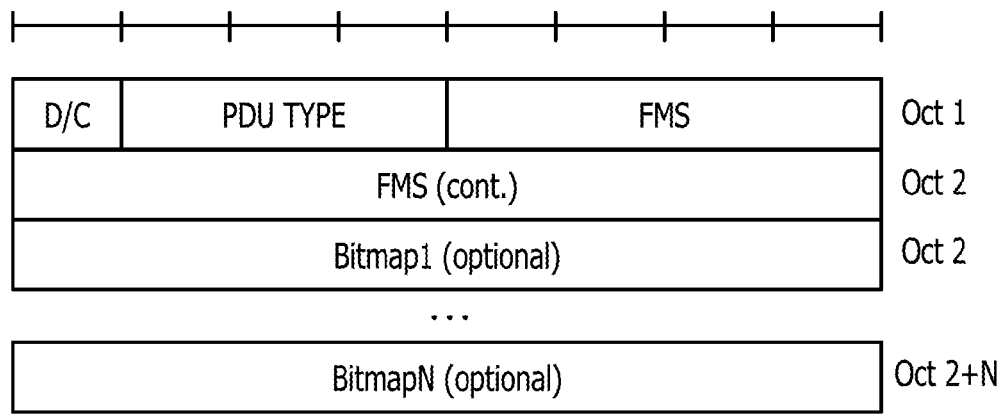

First, for comparison, FIGS. 20A and 20B illustrate a PDCP Control PDU in the conventional LTE system. FIG. 20A illustrates a PDCP Control PDU relating to control of Robust Header Compression (ROHC), and FIG. 20B illustrates a PDCP Control PDU referred to as a PDCP status report. A focused part in the RLC control PDU illustrated in FIGS. 20A and 20B is a field referred to as a PDU Type. The PDU Type is 3-bit information indicating the type of the PDCP Control PDU. Here, it is importance that the PDU Type is reserved when the PDU Type has a value other than "000" and "001". Regions other than the PDU Type have little relationship with this application, and thus descriptions thereof will be omitted.

Figure 21A:
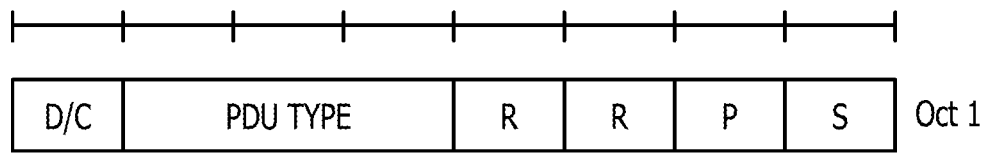
FIGS. 21A and 21B are diagrams illustrating examples of PDCP control PDUs in the third embodiment.
Figure 21B:
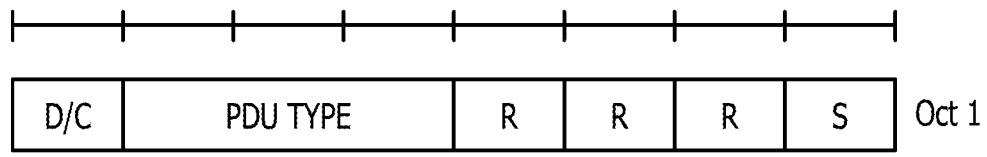

FIGS. 21A to 21B illustrate PDCP Control PDUs used in this embodiment. In a PDCP Control PDU illustrated in FIG. 21A, the value of the PDU Type is set to any one (for example, "010") of a reserved bit string. Thus, the type of the PDCP Control PDU can be newly set so as to be proper for the purpose of this application. In other words, even when a format of the PDCP Control PDU is newly set so as to be proper for the purpose of this application, compatibility with specifications can be ensured.

The PDCP Control PDU illustrated in FIG. 21A includes two parameters of P and S. Each of these parameters has one bit. Activation of the PDCP entity is designated as 1 and deactivation of the PDCP entity is designated as 0. More specifically, P is used for designating activation or deactivation of a primary RLC entity. S is used for designating activation or deactivation of a secondary RLC entity. Not-being individually configured in the uplink and the downlink, similarly to the RLC control PDU (illustrated in FIG. 15A or FIG. 15D) in the second embodiment is because RLC in the protocol stack is divided into RLC in the uplink and RLC in the downlink, on the other hand, PDCP is not divided into PDCP in the uplink and PDCP in the downlink.

In S311 of FIG. 18, the first radio base station 10a transmits a PDCP Control PDU for causing the second radio base station 10b to activate an additional entity, to the radio terminal 20 based on the determination of S310. At this time, for example, in the RLC control PDU illustrated in FIG. 21A, the value of the PDU Type can be set to "010", a value of P can be set to 1 (activation), a value of S can be set to 1 (activation). This setting corresponds to holding of the PDCP entity activated in the first radio base station 10a and causing the second radio base station 10b to activate the additional PDCP entity. In other words, this setting corresponds to the radio terminal 20 performing dual connectivity with the first radio base station 10a and the second radio base station 10b.

Activation or deactivation only for the secondary RLC entity can be designated in the PDCP Control PDU without designation of activation or deactivation for the primary RLC entity, as in the RLC control PDU illustrated in FIG. 15C. FIG. 21B illustrates another example of the PDCP Control PDU in this embodiment.

The PDCP Control PDU according to the third embodiment can include information indicating a form of using a primary PDCP entity and a secondary PDCP entity in each of the C-Plane (SRB) and the U-Plane (DRB). This inclusion can be performed by using a method similar to that for RLC control PDU (illustrated in FIG. 15D) in the second embodiment, and thus descriptions thereof will be omitted herein.

As described in the second embodiment, activation can be suspended by performing control with the timer. As specific timer control, for example, a method in which if the PDCP Control PDU for causing the radio terminal 20 to activate the PDCP entity is received, a timer (deactivation timer) is started and if a value of the timer reaches a preset value (period of time), the timer is run out is included. The value of the timer can be set in S304 or S306, for example. As a layer having the timer, the PDCP layer is optimal, but other layers can be applied. Since it is preferable that suspension of activation is performed with synchronization of the radio base station 10 with the radio terminal 20, a timer also counts similarly in the radio base station 10.

According to the third embodiment described above, it is possible to obtain effects similar to those in the first and the second embodiments. That is, according to the third embodiment, either of the delay problem due to the L3 control signal (RRC signal) and the problem of expansibility due to the L2 control signal (PDCP Control PDU) can be solved and dividing of data in the data link layer (PDCP layer), which is starting of the dual connectivity can be realized. Accordingly, according to the third embodiment, it is possible to realize switching of the dual connectivity (division of data in the data link layer) having both of a high speed and compatibility.

Fourth Embodiment

A fourth embodiment is obtained by applying the first embodiment to the LTE system. Specifically, the L2 entity (processing entity) in the first embodiment is changed to a MAC entity, the first control signal is changed to an RRC signal, and the second control signal is changed to a MAC control packet. That is, in the fourth embodiment, a plurality of MAC entities is activated and thus data is divided in the MAC layer so as to realize the dual connectivity and the like.

The fourth embodiment is obtained by applying the first embodiment to the LTE system, similarly to the second and the third embodiments. Accordingly, processing in the fourth embodiment has many common points with the processing in the second and the third embodiments. Thus, descriptions will be made below focused on differences between the fourth embodiment and the second embodiment.

Figure 22:
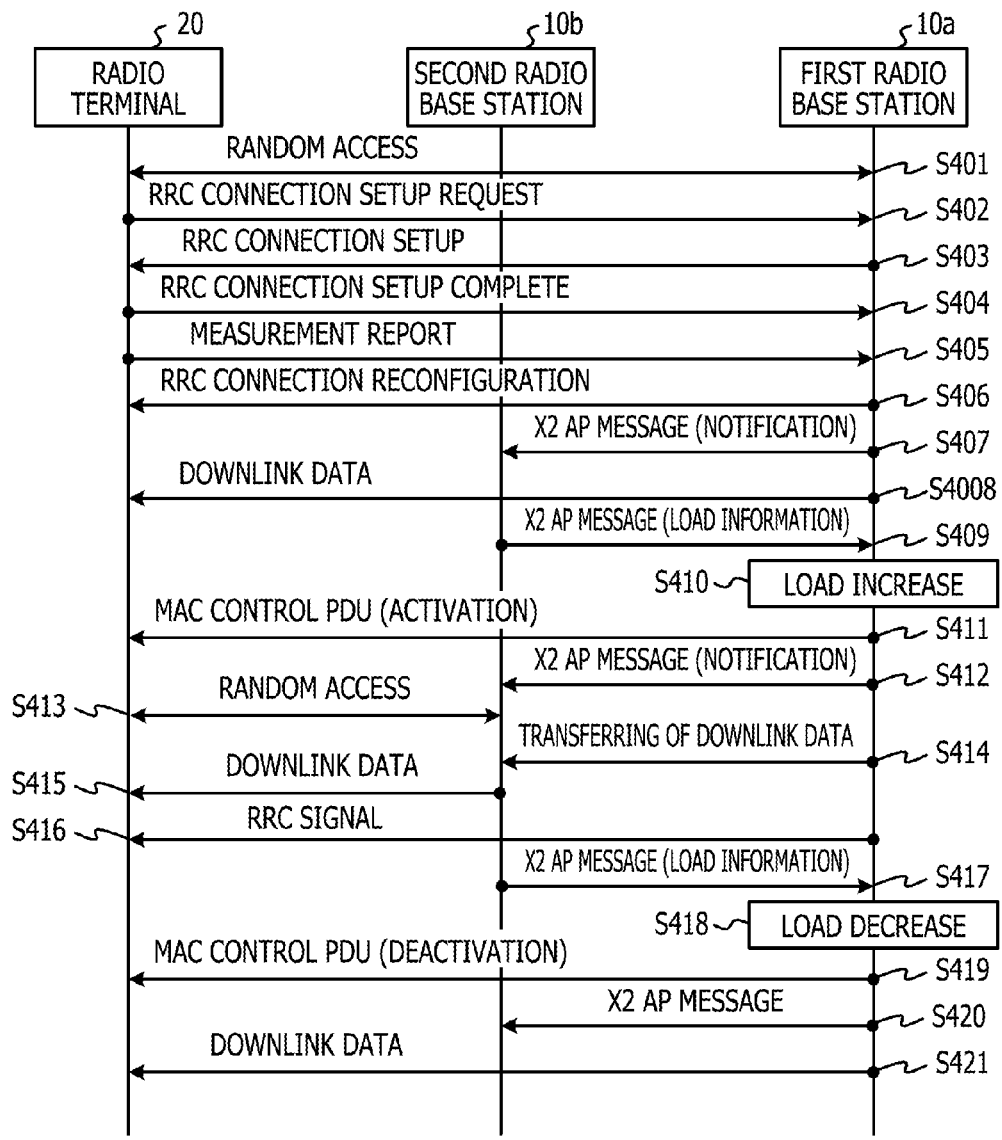
FIG. 22 is a diagram illustrating an example of processing sequences of a radio communication system according to a fourth embodiment.

FIG. 22 illustrates an example of processing sequences according to the fourth embodiment. Similarly to those in the first to the third embodiments, there are also a radio terminal 20, a first radio base station 10a, and a second radio base station 10b in the fourth embodiment. As a typical example, a case where the first radio base station 10a is a macro radio base station 10 and the second radio base station 10b is a small radio base station 10 is considered. However, the first radio base station 10a can be the small radio base station 10, and the second radio base station 10b can be the macro radio base station 10.

Figure 23:
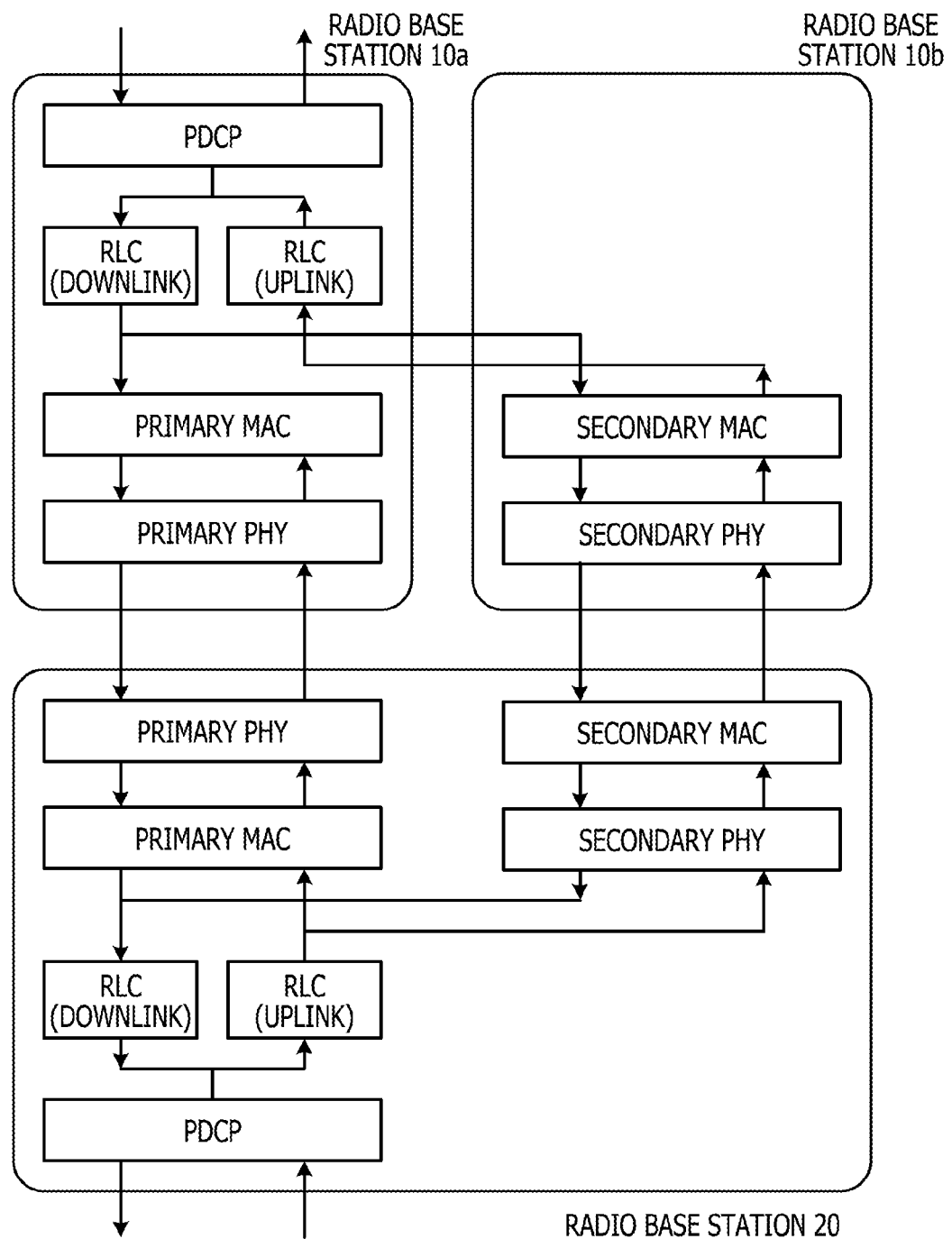
FIG. 23 is a diagram illustrating a protocol stack of data communication in the radio communication system according to the fourth embodiment.

A protocol stack of the fourth embodiment, which is different from that in the second embodiment will be described. FIG. 23 illustrates an example of a protocol stack of an U-Plane according to the fourth embodiment. As described in the beginning, in the fourth embodiment, a plurality of MAC entities is activated, and thus data is divided in the MAC layer so as to realize the dual connectivity and the like. FIG. 23 illustrates entities activated by the first radio base station 10a (for example, macro radio base station 10) and the second radio base station 10b (for example, small radio base station 10). A PDCP entity and an RLC entity are activated only by the first radio base station 10a. A MAC entity and a physical entity are activated by each of the first radio base station 10a and the second radio base station 10b. In this manner, data can be divided in the MAC layer so as to realize the dual connectivity and the like by activating a plurality of MAC entities.

Accordingly, in the second embodiment described above, a plurality of RLC entities is activated and thus data is divided in the RLC layer so as to realize the dual connectivity and the like. However, in the fourth embodiment, a plurality of MAC entities is activated and thus data is divided in the MAC layer so as to realize the dual connectivity and the like. In other words, the fourth embodiment is different from the second embodiment in the class (layer) of the processing for performing the dual connectivity and the like.

Next, the processing sequences (illustrated in FIG. 22) in the fourth embodiment will be described. The processing sequences in the fourth embodiment are almost the same as the processing sequences in the second embodiment illustrated in FIG. 6. Descriptions of the processing sequence (illustrated in FIG. 22) in the fourth embodiment can be substantially obtained by substituting "RLC" with "MAC" in the descriptions of the processing sequences (illustrated in FIG. 6) in the second embodiment and reading a result of substitution. Accordingly, detailed descriptions of the processing sequences illustrated in FIG. 22 will be omitted herein.

A difference between S411 in FIG. 22 and S211 in FIG. 6 will be described herein. In S411 in FIG. 22 and S211 in FIG. 6, the first radio base station 10a transmits an L2 signal for activating an additional L2 entity (secondary L2 entity) to the radio terminal 20. However, in S211 of FIG. 6, the transmitted L2 signal is an RLC control PDU, but in S411 of FIG. 22, the transmitted L2 signal is a MAC Control PDU. That is, in the fourth embodiment, the first radio base station 10a transmits a MAC Control PDU for activating an additional MAC entity (MAC PDCP entity) to the radio terminal 20 in S411 of FIG. 22.

The MAC Control PDU has a format largely different from the RLC control PDU illustrated in FIGS. 15A to 15D, and thus descriptions thereof will be made below.

Figure 24A:
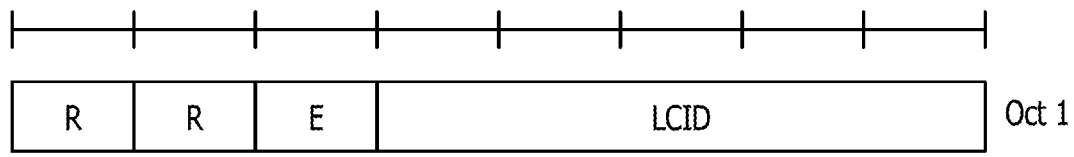
FIGS. 24A and 24B are diagrams illustrating MAC control PDUs in the LTE system.

First, FIG. 24A illustrates a MAC sub-header included (accompanying a MAC SDU) in a MAC PDU in the LTE system. A focused part in the MAC sub-header illustrated in FIG. 24A is a 5-bit field referred to as a Logical Channel ID (LCID). The LCID indicates the type of the MAC Control PDU. For example, when a value of the LCID in a downlink MAC sub-header is "11011", a MAC Control PDU including the MAC sub-header designates activation or deactivation of each carrier in carrier aggregation described above.

Figure 24B:
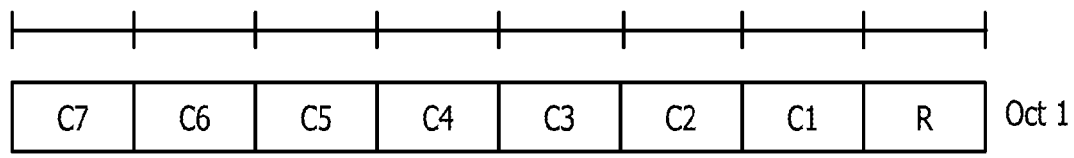

For comparison, FIG. 24B illustrate a MAC Control PDU in the conventional LTE system. The MAC Control PDU has any type, but a MAC Control PDU illustrated in FIG. 24 is a MAC Control PDU for controlling the carrier aggregation described above (corresponds to a case where the value of the LCID is "11011"). A focused part in the MAC Control PDU illustrated in FIG. 24 is that a reserved bit R of 1 bit is included and a value of the reserved bit R is normally set to 0.

FIGS. 25A to 25D illustrate MAC Control PDUs used in this embodiment.

Figure 25A:
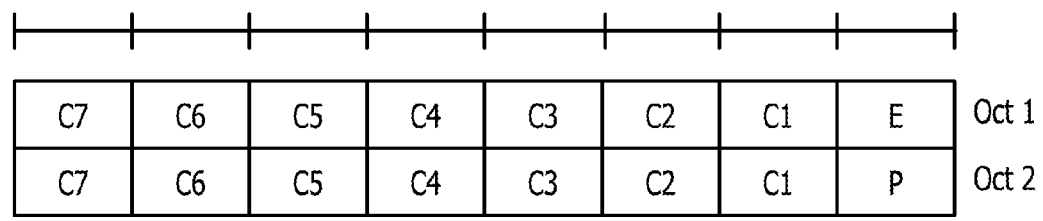
FIGS. 25A, 25B, 25C and 25D are diagrams illustrating examples of a MAC control PDU in the fourth embodiment.

First, in the MAC Control PDU illustrated in FIG. 25A, an expansion bit E instead of the reserved bit R is prepared in a first octet (Oct1). A value of the expansion bit is set to 1 and thus the MAC Control PDU can be newly set so as to be proper for the purpose of this application. If the value of the expansion bit is set to 0, the MAC Control PDU is the same as the conventional MAC Control PDU (FIG. 24). It is considered in the MAC Control PDU illustrated in FIG. 25A that there is no problem even when the value of the LCID included in the MAC sub-header is set to "11011" (the same value illustrated in FIG. 24). This is because it can be determined whether the MAC Control PDU is the MAC Control PDU illustrated in either of FIGS. 25A and 24, based on the value of E. In other words, according to the MAC Control PDU illustrated in FIG. 25A, compatibility with specifications can be ensured and a function proper for the purposes of this application can be added.

As described above, the value of the expansion bit in the MAC Control PDU (illustrated in FIG. 25A) according to the fourth embodiment is set to 1. This means that the MAC Control PDU is continuative (second octet exists). The first octet (Oct1) of the MAC Control PDU in FIG. 25 indicates activation or deactivation of each cell (carrier) by the primary MAC entity.

More specifically, in the MAC Control PDU according to the fourth embodiment illustrated in FIG. 25A, the first octet (Oct1) includes seven parameters $C_1$ to $C_7$ in addition to the expansion bit E. Each of the seven parameters $C_1$ to $C_7$ has one bit. Here, a Primary Cell (PCell) and a Secondary Cell (SCell) are in a cell. However, $C_1$ to $C_7$ of the Oct1 are parameters for causing the primary MAC entity to set activation or deactivation of each of the maximum 7 SCells. Here, the PCell is a cell (carrier) normally activated in carrier aggregation. The SCell is a cell in which activation or deactivation is performed as occasion calls. There is no field for performing a configuration for the PCell in the Oct1 of FIG. 25A. This is because there is a premise that the PCell in the primary MAC entity (first radio base station 10a in the example of FIG. 18) is normally activated.

A second octet (Oct2) of the MAC Control PDU (illustrated in FIG. 25A) in the fourth embodiment includes seven parameters $C_1$ to $C_7$ and a 1-bit parameter P. A secondary MAC entity (second radio base station 10b in the example of FIG. 18) can not have a premise that the PCell is normally activated. Thus, activation or deactivation of the PCell is designated by one bit of P, and activation or deactivation of each of SCells (7 at the maximum) is designated by 7 bits of $C_1$ to $C_7$ in the Oct2. When all of 8 bits which is the summation of P and $C_1$ to $C_7$ in the Oct2 have 0 (deactivation), it can be analyzed that the 8 bits of 0 indicates deactivation of the secondary MAC entity. In addition, not-being individually configured in the uplink and the downlink, similarly to the RLC control PDU (illustrated in FIG. 15A or FIG. 15B) in the second embodiment is because RLC in the protocol stack is divided into RLC in the uplink and RLC in the downlink, on the other hand, MAC is not divided into MAC in the uplink and MAC in the downlink.

Two methods for realizing multiple connectivity of three sources or more are considered for the MAC Control PDU (illustrated in FIG. 25A) in the fourth embodiment. In a first method, when the maximum number for performing multiple connectivity is set as N, a MAC Control PDU of N octets is normally used. As a second method, there is a method in which the number (corresponding to the number of octets in the MAC Control PDU of FIG. 25A) of performing multiple connectivity is changed in accordance with the value of the LCID. Since 16 values of "01011" to "11010" are reserved as the value of the LCID, if these values are used, the values can correspond to multiple connectivity up to the maximum 16. These methods can be also similarly applied to a MAC Control PDU (illustrated in FIG. 25B) which will be described next.

Figure 25B:
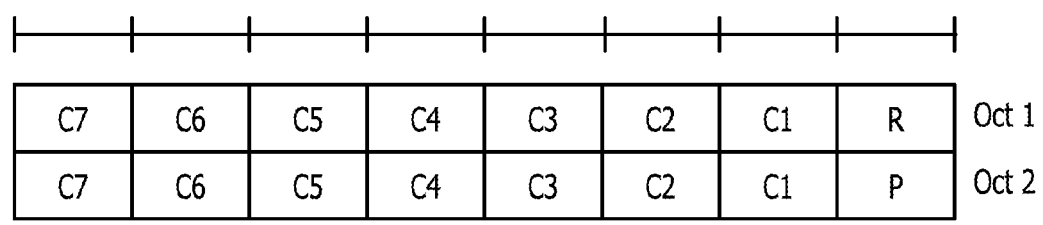

Other MAC Control PDUs in the fourth embodiment will be described simply. The MAC Control PDU illustrated in FIG. 25B is different from the MAC Control PDU illustrated in FIG. 25A. In the MAC Control PDU illustrated in FIG. 25B, the expansion bit E of the first octet (Oct1) is set as a reserved bit R. It is noted that the value of the LCID included in the MAC sub-header being set to, for example, "11010" (one of reserved values) is desired in the MAC Control PDU illustrated in FIG. 25B. If the value of the LCID is set to "11011" (the same value illustrated in FIG. 24), determination of whether the MAC Control PDU is the MAC Control PDU in FIG. 25B or the MAC Control PDU in FIG. 24 is impossible.

Figure 25C:
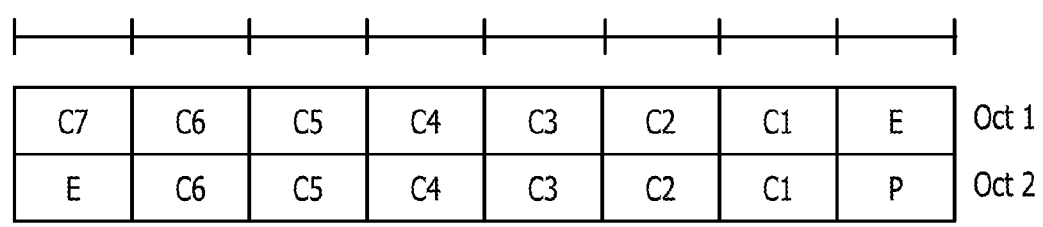

A MAC Control PDU illustrated in FIG. 25C is different from the MAC Control PDU illustrated in FIG. 25A. In the MAC Control PDU illustrated in FIG. 25C, an expansion bit E is provided in the second octet (Oct2) instead of $C_7$. The MAC Control PDU can easily correspond to multiple connectivity by using the value of E in each octet. However, the MAC Control PDU corresponds to only six SCells at the maximum in the MAC entity. Similarly to that illustrated in FIG. 25A, it is considered that there is no problem in the MAC Control PDU illustrated in FIG. 25C, even when the value of the LCID is set to "11011" (the same value illustrated in FIG. 24).

Figure 25D:
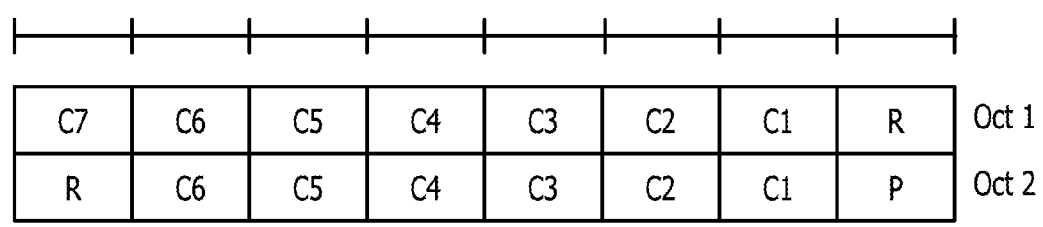

A MAC Control PDU illustrated in FIG. 25D is obtained by combining the MAC Control PDU illustrated in FIG. 25B and the MAC Control PDU illustrated in FIG. 25C, and thus descriptions thereof will be omitted. It is noted that the value of the LCID included in the MAC sub-header being set to, for example, "11010" (one of the reserved values) is also desired in the MAC Control PDU illustrated in FIG. 25D, similarly to the MAC Control PDU illustrated in FIG. 25B.

In S411 of FIG. 22, the first radio base station 10a transmits a MAC Control PDU for causing the second radio base station 10b to activate an additional entity, to the radio terminal 20 based on the determination of S410. At this time, for example, in the MAC Control PDU illustrated in FIG. 25A, a value of a first octet can be set to "00000011", and a value of a second octet can be set to "00000001". This setting corresponds to holding of the MAC entity (only PCell) activated in the first radio base station 10a and causing the second radio base station 10b to activate the additional MAC entity (only PCell). In other words, this setting corresponds to the radio terminal 20 performing dual connectivity with the first radio base station 10a and the second radio base station 10b.

If the value of the first octet is set to "00000001", and the value of the second octet is set to "00000011" in the MAC Control PDU illustrated in FIG. 25A, this setting corresponds to holding of the MAC entity (only PCell) activated in the first base station 10a and causing the second radio base station 10b to activate the additional MAC entity (PCell and one Scell). In this case, the radio terminal 20 performs the dual connectivity with the second radio base station 10b.

The MAC Control PDU in the fourth embodiment can include information indicating a form of using a primary MAC entity and a secondary MAC entity in each of the C-Plane (SRB) and the U-Plane (DRB). This inclusion can be performed by using a method similar to that for RLC control PDU (illustrated in FIG. 15D) in the second embodiment, and thus descriptions thereof will be omitted herein.

According to the fourth embodiment described above, it is possible to obtain effects similar to those in the first to the third embodiments. That is, according to the fourth embodiment, either of the delay problem due to the L3 control signal (RRC signal) and the problem of expansibility due to the L2 control signal (MAC Control PDU) can be solved and dividing of data in the data link layer (MAC layer), which is starting of the dual connectivity can be realized. Accordingly, according to the fourth embodiment, it is possible to realize switching of the dual connectivity (division of data in the data link layer) having both of a high speed and compatibility, and this new effect is not obtained in the conventional technology.

Other Embodiments

Here, other modification example and embodiment will be described simply.

In the first to the fourth embodiments, the information regarding the additional L2 entity (secondary L2 entity) is transmitted by using the L3 control signal, but can be transmitted by using the L2 control signal, in principle. If the second embodiment is used as an example, the entirety or a portion of information included in the RRCConnectionReconfiguration message illustrated in FIGS. 11 to 13, for example, can be included in the RLC control PDU transmitted in S211 of FIG. 6. In this case, compatibility can be ensured and the information can be stored, by appropriately using a reserved field or the reserved bit in the RLC control PDU. Descriptions thereof will be omitted.

In the first to the fourth embodiments, the information for designating activation or deactivation of the additional L2 entity (secondary L2 entity) is transmitted by using the L2 control signal, but can be transmitted by using the L3 control signal, in principle. If the second embodiment is used as an example, the entirety or a portion of information included in the RLC control PDU illustrated in FIGS. 15A to 15D, for example, can be included in the RRCConnectionReconfiguration message transmitted in S206 of FIG. 6. Descriptions thereof will be omitted.

Lastly, needless to say, it is noted that the information element name, the parameter name, or the like in the control signal transmitted and received by the radio base station 10 or the radio terminal 20 in the above embodiments is just one example. Even when dispositions (orders) of the parameters are different from each other, or even when an optional information element or an optional parameter is not used, these cases can be included within the scope of the invention in this application in a range without departing from the gist of the invention in this application.

[Network Architecture of Radio Communication System in Embodiments]

Figure 26:
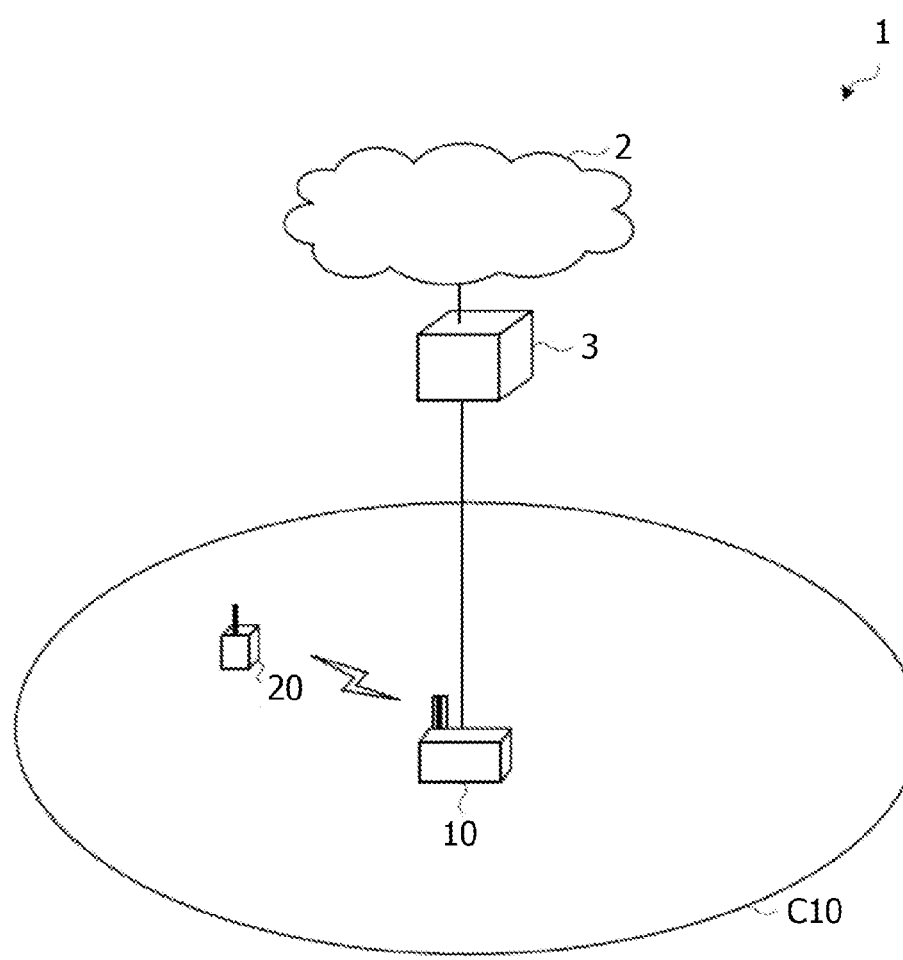
FIG. 26 is a diagram illustrating an example of a network architecture of the radio communication system according to each of the embodiments.

Next, a network architecture of a radio communication system 1 in each of the embodiments will be described based on FIG. 26. As illustrated in FIG. 26, the radio communication system 1 includes the radio base station 10 and the radio terminal 20. The radio base station 10 forms a cell C10. The radio terminal 20 is in the cell C10. It is noted that the radio base station 10 and the radio terminal 20 are referred to as a radio station in this application.

The radio base station 10 is connected to a network device 3 through a wired connection and the network device 3 is connected to a network 2 through a wired connection. The radio base station 10 is provided so as to enable transmission and reception of data or control information with other radio base stations through the network device 3 and the network 2.

A radio communication function with the radio terminal 20 and a digital signal processing and control function in the radio base station 10 may be divided as individual devices. In this case, a device including the radio communication function is referred to as a Remote Radio Head (RRH), and a device including the digital signal processing and control function is referred to as a Base Band Unit (BBU). The RRH can be installed so as to protrude from the BBU. The RRH and the BBU may be wired-connected by using an optical fiber, and the like. The radio base station 10 can be a radio base station of various sizes in addition to a small radio base station (including a micro radio base station, a femto radio base station, and the like) such as a macro radio base station and pico radio base station. When a relaying station is used for relaying radio communication between the radio base station 10 and the radio terminal 20, the relaying station (transmission and reception with the radio terminal 20, and control of transmission and reception) may be also included in the radio base station 10 in this application.

The radio terminal 20 communicates with the radio base station 10 in the radio communication.

The radio terminal 20 can be a radio terminal such as a portable phone, a smartphone, a personal digital assistant (PDA), a personal computer, and various devices or equipment having the radio communication function (sensor device or the like). When a relaying station for relaying the radio communication between the radio base station 10 and the radio terminal is used, the relaying station (transmission and reception with the radio base station 10, and control of transmission and reception) may be also included in the radio terminal 20 in this application.

The network device 3 includes, for example, a communication unit and a control unit. The components are connected so as to enable input and output of a signal or data in a uni-direction or a bi-direction. The network device 3 is realized by a gateway, for example. As a hardware configuration of the network device 3, for example, the communication unit is realized with an interface circuit. The control unit is realized with a processor and a memory.

A specific form of distribution or unification of the components of the radio base station and the radio terminal is not limited to the form of the first embodiment. A configuration can be made by functionally or physically distributing or unifying all or some of the components in any unit in accordance with various loads or various usages. For example, the memory may be connected as an external device of the radio base station and the radio terminal through a network or a cable.

[Functional Configuration of Each Device in Radio Communication System According to Each of Embodiments]

Next, a functional configuration of each device in the radio communication system according to each of the embodiments will be described based on FIGS. 27 and 28.

Figure 27:
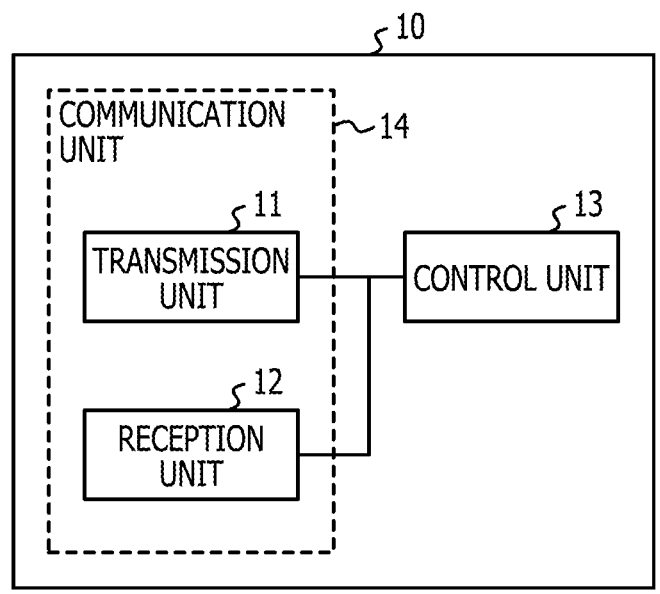
FIG. 27 is a diagram illustrating an example of a functional configuration of a radio base station in each of the embodiments.

FIG. 27 is a functional block diagram illustrating a configuration of the radio base station 10. As illustrated in FIG. 27, the radio base station 10 includes a transmission unit 11, a reception unit 12, and a control unit 13. These components are connected so as to enable input and output of a signal or data in a uni-direction or a bi-direction. Combination of the transmission unit 11 and the reception unit 12 is referred to as a communication unit 14.

The transmission unit 11 transmits a data signal or a control signal through an antenna in radio communication. The antenna may be commonly used in transmission and reception. The transmission unit 11 transmits a downlink signal through, for example, a downlink data channel or a control channel. The downlink data channel includes a physical downlink shared channel (PDSCH), for example. The downlink control channel includes a physical downlink control channel (PDCCH). A signal to be transmitted includes, for example, an L1/L2 control signal transmitted to the radio terminal 20 in the connection state on a control channel, and a user data signal or a radio resource control (RRC) control signal transmitted to the radio terminal 20 in the connection state on a data channel. The signal to be transmitted includes, for example, a reference signal used for channel estimation or demodulation.

As a specific example of the signal transmitted by the transmission unit 11, signals which are illustrated in FIGS. 6, 18, and 22 and are transmitted by the first radio base station 10a or the second radio base station 10b. Particularly, the transmission unit 11 can transmit the RRC message illustrated in FIGS. 11 to 13 or in FIGS. 16 and 17, the RLC control PDU illustrated in FIGS. 15A to 15D, the PDCP Control PDU illustrated in FIGS. 21A and 21B, and the MAC Control PDU illustrated in FIGS. 25A to 25D. The signal transmitted by the transmission unit 11 is not limited thereto, and includes all signals transmitted by the radio base station 10 in the embodiments and the modification example.

The reception unit 12 receives a data signal or a control signal transmitted from the radio terminal 20 through the antenna in first radio communication. The reception unit 12 receives an uplink signal through an uplink data channel or the control channel, for example. The uplink data channel includes a physical uplink shared channel (PUSCH), for example. The uplink control channel includes a physical uplink control channel (PUCCH), for example. A signal to be received includes, for example, an L1/L2 control signal transmitted from the radio terminal 20 in the connection state on the control channel, and a user data signal or the radio resource control (RRC) control signal transmitted from the radio terminal 20 in the connection state on a data channel. The signal to be received includes the reference signal used for channel estimation or demodulation, for example.

As a specific example of the signal received by the reception unit 12, signals which are illustrated in FIGS. 6, 18, and 22 and are received by the first radio base station 10a or the second radio base station 10b. The signal to be received by the reception unit 12 is not limited thereto, and includes all signals received by the radio base station 10 in the embodiments and the modification example.

The control unit 13 outputs data or control information to be transmitted to the transmission unit 11. The control unit 13 receives an input of received data or received control information from the reception unit 12. The control unit 13 acquires the data or the control information from the network device 3 or other radio base stations through wired connection or wireless connection. The control unit performs various types of control associated with various transmission signals transmitted by the transmission unit 11 or various reception signals received by the reception unit 12 in addition to the above descriptions.

As a specific example of processing controlled by the control unit 13, processing which is illustrated in FIGS. 6, 18, and 22 and is performed by the first radio base station 10a or the second radio base station 10b. The processing controlled by the control unit 13 is not limited thereto, and includes all types of processing performed by the radio base station 10 in the above embodiment and the modification example.

Figure 28:
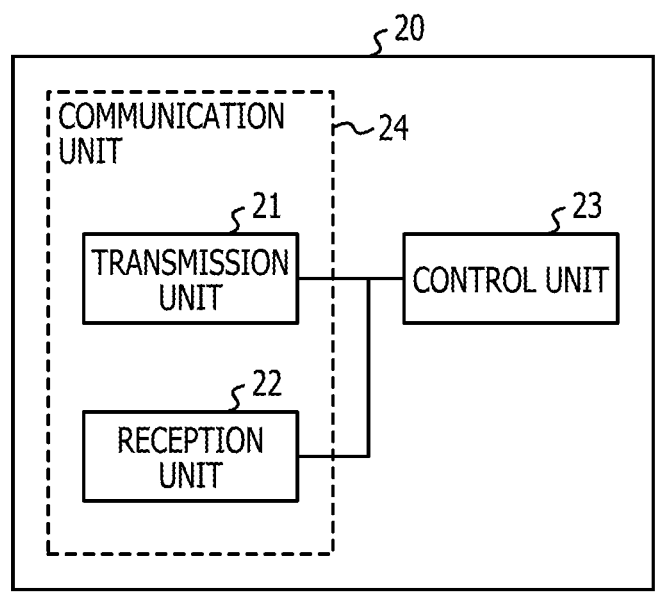
FIG. 28 is a diagram illustrating an example of a functional configuration of a radio terminal in each of the embodiments.

FIG. 28 is a functional block diagram illustrating a configuration of the radio terminal 20. As illustrated in FIG. 28, the radio terminal 20 includes a transmission unit 21, a reception unit 22, and a control unit 23. The components are connected to each other so as to enable input and output of a signal or data in a uni-direction or a bi-direction. Combination of the transmission unit 21 and the reception unit 22 is referred to as a communication unit 24.

The transmission unit 21 transmits a data signal or a control signal through an antenna in radio communication. The antenna may be commonly used in transmission and reception. The transmission unit 21 transmits an uplink signal through, for example, an uplink data channel or a control channel. The uplink data channel includes a physical uplink shared channel (PUSCH), for example. The uplink control channel includes a physical uplink control channel (PUCCH). A signal to be transmitted includes, for example, an L1/L2 control signal transmitted to the radio base station 10 in a state of connection on a control channel, and a user data signal or a radio resource control (RRC) control signal transmitted to the radio base station 10 in a state of connection on a data channel. The signal to be transmitted includes, for example, a reference signal used for channel estimation or demodulation.

As a specific example of the signal transmitted by the transmission unit 21, signals which are illustrated in FIGS. 6, 18, and 22 and are transmitted by the radio terminal 20. The signal transmitted by the transmission unit 21 is not limited thereto, and includes all signals transmitted by the radio terminal 20 in the embodiments and the modification example.

The reception unit 22 receives a data signal or a control signal transmitted from the radio base station 10 through the antenna in radio communication. The reception unit 22 receives a downlink signal through a downlink data channel or the control channel, for example. The data channel includes a physical downlink shared channel (PDSCH), for example. The downlink control channel includes a physical downlink control channel (PDCCH), for example. A signal to be received includes, for example, an L1/L2 control signal transmitted from the radio base station 10 in a state of connection on the control channel, and a user data signal or the radio resource control (RRC) control signal transmitted from the radio base station 10 in a state of connection on a data channel. The signal to be received includes the reference signal used for channel estimation or demodulation, for example.

As a specific example of the signal transmitted by the reception unit 22, signals which are illustrated in FIGS. 6, 18, and 22 and are received by the radio terminal 20. Particularly, the reception unit 22 can receive the RRC message illustrated in FIGS. 11 to 13 or in FIGS. 16 and 17, the RLC control PDU illustrated in FIGS. 15A to 15D, the PDCP Control PDU illustrated in FIGS. 21A and 21B, and the MAC Control PDU illustrated in FIGS. 25A to 25D. The signal to be received by the reception unit 22 is not limited thereto, and includes all signals received by the radio terminal 20 in the embodiments and the modification example.

The control unit 23 outputs data or control information to be transmitted to the transmission unit 21. The control unit 23 receives an input of received data or received control information from the reception unit 22. The control unit 23 acquires the data or the control information from the network device 3 or other radio base stations through wired connection or wireless connection. The control unit performs various types of control associated with various transmission signals transmitted by the transmission unit 21 or various reception signals received by the reception unit 22 in addition to the above descriptions.

As a specific example of processing controlled by the control unit 23, processing which is illustrated in FIGS. 6, 18, and 22 and is performed by the radio terminal 20. The processing controlled by the control unit 23 is not limited thereto, and includes all types of processing performed by the radio terminal 20 in the above embodiment and the modification example.

[Hardware Configuration of Each Device in Radio Communication System According to Each of Embodiments]

A hardware configuration of each device in the radio communication system according to each of the embodiments and the modification example will be described based on FIGS. 29 and 30.

Figure 29:
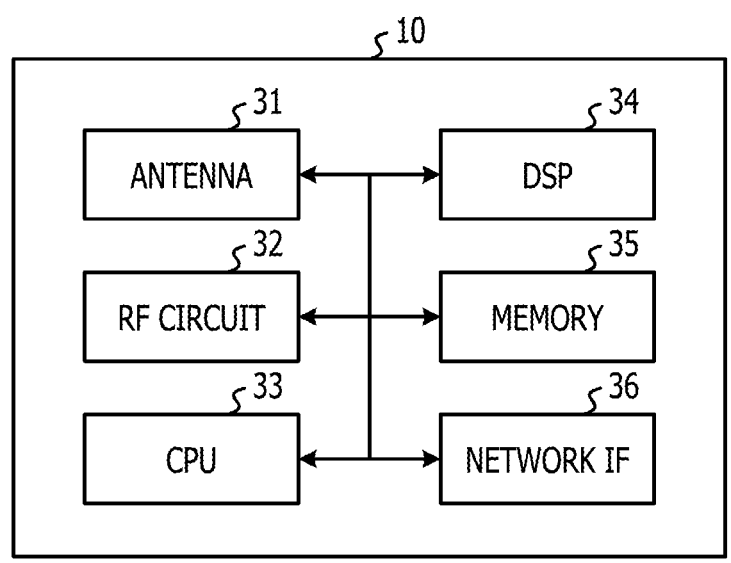
FIG. 29 is a diagram illustrating an example of a hardware configuration of the radio base station in each of the embodiments.

FIG. 29 is a diagram illustrating a hardware configuration of the radio base station 10. As illustrated in FIG. 29, the radio base station 10 includes a radio frequency (RF) circuit 32 including an antenna 31, a central processing unit (CPU) 33, a digital signal processor (DSP) 34, a memory 35, and a network IF (interface) 36 as hardware components. The CPU is connected so as to enable an input and an output of various signals or various items of data through a bus. The memory 35 includes at least one of a random access memory (RAM) such as a synchronous dynamic random access memory (SDRAM), a read only memory (ROM), and a flash memory. The memory 35 stores a program, control information, or data.

Correspondence of the functional configuration of the radio base station 10 illustrated in FIG. 27 and the hardware configuration of the radio base station 10 illustrated in FIG. 29 will be described. The transmission unit 11 and the reception unit 12 (or communication unit 14) are realized, for example, by the RF circuit 32 or by the antenna 31 and the RF circuit 32. The control unit 21 is realized by the CPU 33, the DSP 34, the memory 35, a digital electronic circuit (not illustrated), and the like. As the digital electronic circuit, for example, an application specific integrated circuit (ASIC), a field-programming gate array (FPGA), a large scale integration (LSI), and the like are included.

Figure 30:
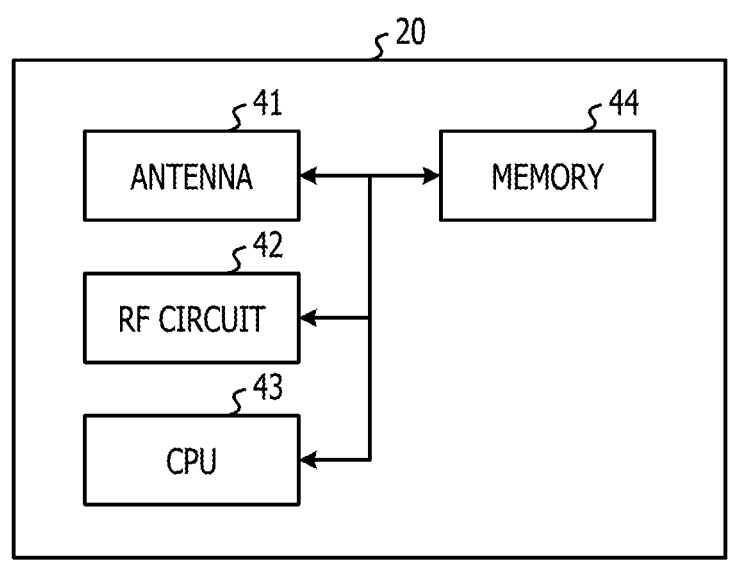
FIG. 30 is a diagram illustrating an example of a hardware configuration of the radio terminal in each of the embodiments.

FIG. 30 is a diagram illustrating a hardware configuration of the radio terminal 20. As illustrated in FIG. 30, the radio terminal 20 includes an RF circuit 42 including an antenna 41, a CPU 43, and a memory 44 as hardware components. The radio terminal 20 may include a display device such as a liquid crystal display (LCD), which is connected to the CPU 43. The memory 44 includes at least one of a RAM such as an SDRAM, a ROM, and a flash memory. The memory 44 stores a program, control information, or data.

Correspondence of the functional configuration of the radio terminal 20 illustrated in FIG. 28 and the hardware configuration of the radio terminal 20 illustrated in FIG. 30 will be described. The transmission unit 21 and the reception unit 22 (or communication unit 24) are realized, for example, by the RF circuit 42 or by the antenna 41 and the RF circuit 42. The control unit 23 is realized by the CPU 43, the memory 44, a digital electronic circuit (not illustrated), and the like. As the digital electronic circuit, for example, an ASIC, a FPGA, a LSI, and the like are included.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication method comprising:
   transmitting first information from a first radio station to a second radio station before determining an activation of a second logical processing entity that is to be activated in a first processing layer of the second radio station in association with a first logical processing entity that has been activated in the first processing layer of the second radio station, the first information relating to the activation of the second logical processing entity, the first information being transmitted using a first control signal in a higher layer of the first processing layer;
   transmitting, when determining the activation of the second logical processing entity, second information for instructing the activation from the first radio station to the second radio station, the second information being transmitted using a second control signal in the first processing layer; and
   activating the second logical processing entity by the second radio station based on the first information in response to the second information, wherein
   the second information is transmitted using a reserved field or a reserved value in the second control signal.

2. The radio communication method according to claim 1, wherein
   the first logical processing entity deals with a radio communication with the first radio station.

3. The radio communication method according to claim 2, wherein
   the second logical processing entity deals with a radio communication with a third radio station different from the first radio station.

4. The radio communication method according to claim 1, wherein
   the first logical processing entity and the second logical processing entity are entities in radio link control (RLC) layer of the first processing layer, and
   the second control signal is a control packet in the RLC layer.

5. The radio communication method according to claim 1, wherein
   the first logical processing entity and the second logical processing entity are entities in packet data convergence protocol (PDCP) layer of the first processing layer, and
   the second control signal is a control packet in the PDCP layer.

6. The radio communication method according to claim 1, wherein
    the first logical processing entity and the second logical processing entity are entities in media access control (MAC) layer of the first processing layer, and
    the second control signal is a control packet in the MAC layer.

7. The radio communication method according to claim 1, wherein
    the first control signal is a control signal in radio resource control (RRC) layer.

8. The radio communication method according to claim 1, further comprising:
    transmitting, when determining a deactivation of the first logical processing entity or the second logical processing entity, third information for instructing the deactivation from the first radio station to the second radio station, the second information being transmitted using the second control signal; and
    deactivating the first logical processing entity or the second logical processing entity by the second radio station in response to the third information.

9. A radio communication system comprising:
    a first radio station configured to:
    transmit first information to a second radio station before determining an activation of a second logical processing entity that is to be activated in a first processing layer of the second radio station in association with a first logical processing entity that has been activated in the first processing layer of the second radio station, the first information relating to the activation of the second logical processing entity, the first information being transmitted using a first control signal in a higher layer of the first processing layer, and
    transmit, when determining the activation of the second logical processing entity, second information for instructing the activation to the second radio station, the second information being transmitted using a second control signal in the first processing layer; and
    the second radio station configured to:
    activate the second logical processing entity based on the first information in response to the second information, wherein
    the second information is transmitted using a reserved field or a reserved value in the second control signal.

10. A radio station comprising:
    a memory; and
    a processor coupled to the memory and configured to:
    transmit first information to another radio station before determining an activation of a second logical processing entity that is to be activated in a first processing layer of the other radio station in association with a first logical processing entity that has been activated in the first processing layer of the other radio station, the first information relating to the activation of the second logical processing entity, the first information being transmitted using a first control signal in a higher layer of the first processing layer, and
    transmit, when determining the activation of the second logical processing entity, second information for instructing the activation to the other radio station, the second information being transmitted using a second control signal in the first processing layer, wherein
    the other radio station is configured to activate the second logical processing entity based on the first information in response to the second information, and
    the second information is transmitted using a reserved field or a reserved value in the second control signal.

11. A radio station comprising:
    a memory; and
    a processor coupled to the memory and configured to:
    receive first information from another radio station before determining an activation of a second logical processing entity that is to be activated in a first processing layer of the radio station in association with a first logical processing entity that has been activated in the first processing layer of the radio station, the first information relating to the activation of the second logical processing entity, the first information being transmitted using a first control signal in a higher layer of the first processing layer,
    receive, when determining the activation of the second logical processing entity, second information for instructing the activation from the other radio station, the second information being transmitted using a second control signal in the first processing layer, and
    activate the second logical processing entity based on the first information in response to the second information, wherein
    the second information is transmitted using a reserved field or a reserved value in the second control signal.

* * * * *